(12) United States Patent
Santoro et al.

(10) Patent No.: US 12,546,930 B2
(45) Date of Patent: Feb. 10, 2026

(54) NARROW APERTURE LUMINAIRES AND LIGHT GUIDES THEREFOR

(71) Applicant: LMPG Inc., Longueuil (CA)

(72) Inventors: Scott Santoro, Delta (CA); Kenton Keng Ting Wong, Burnaby (CA)

(73) Assignee: LMPG Inc., Longueuil (CA)

( * ) Notice: Subject to any disclaimer, the term of this patent is extended or adjusted under 35 U.S.C. 154(b) by 0 days.

(21) Appl. No.: 18/433,408

(22) Filed: Feb. 6, 2024

(65) Prior Publication Data

US 2024/0272346 A1    Aug. 15, 2024

Related U.S. Application Data

(60) Provisional application No. 63/445,840, filed on Feb. 15, 2023.

(51) Int. Cl.
F21V 8/00    (2006.01)

(52) U.S. Cl.
CPC ................... G02B 6/0046 (2013.01)

(58) Field of Classification Search
CPC .................................................. G02B 6/0046
See application file for complete search history.

(56) References Cited

U.S. PATENT DOCUMENTS

| | | | |
|---|---|---|---|
| 2004/0170011 A1* | 9/2004 | Kim | G02B 6/0016 362/610 |
| 2013/0051069 A1* | 2/2013 | Moon | G02B 6/0021 257/E33.059 |
| 2020/0332981 A1* | 10/2020 | Shima | F21V 5/046 |

FOREIGN PATENT DOCUMENTS

| | | |
|---|---|---|
| CN | 102563541 A | 7/2012 |
| WO | 2015/038971 A1 | 3/2015 |

* cited by examiner

*Primary Examiner* — Mary Ellen Bowman
(74) *Attorney, Agent, or Firm* — Oyen Wiggs Green & Mutala LLP

(57) ABSTRACT

A light guide for a luminaire is provided. The light guide includes: an elongated base having a light emitting surface at a distal end, and opposing major faces; and a plurality of collimators projecting from the base, wherein each collimator has a light receiving surface at a proximal end. The plurality of collimators are arranged with spaces therebetween along the base. The light emitting surface has notches having a minimum width corresponding to the space between the collimators and a maximum width corresponding to a space between the light receiving surfaces. Substantially all light received at the light receiving surfaces internally reflects through the collimators and the base and emits from the light emitting surface, and the notches are configured to direct light emitted from the light emitting surface at a lower angle than if the notches were not present.

17 Claims, 30 Drawing Sheets

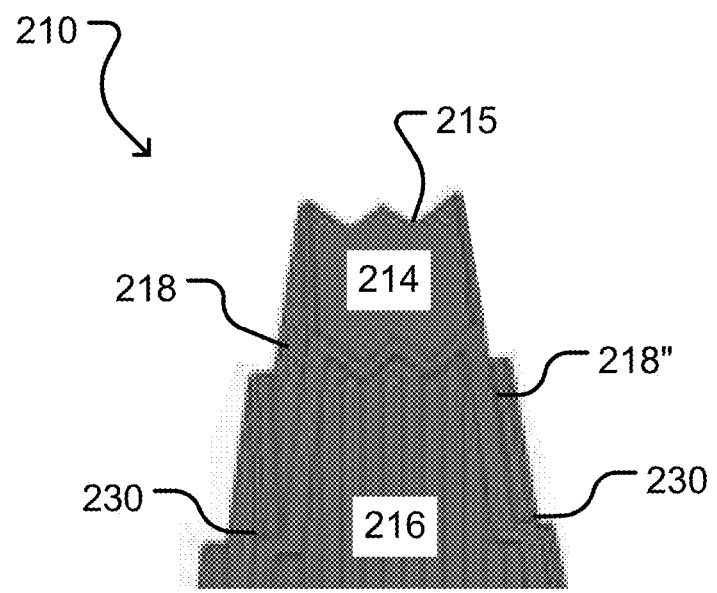
Fig. 8
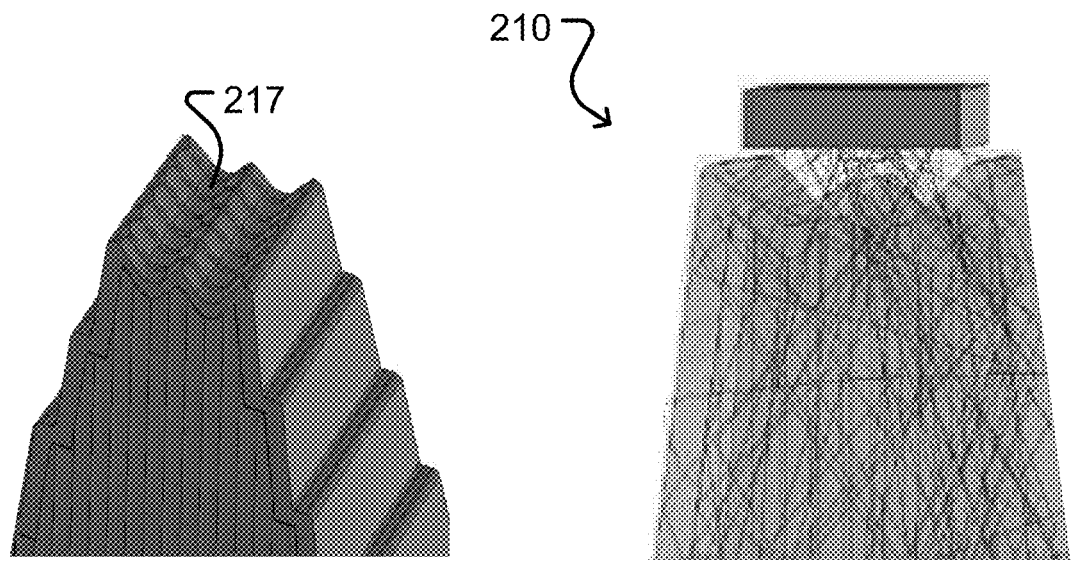
Fig. 8A
Fig. 9

400

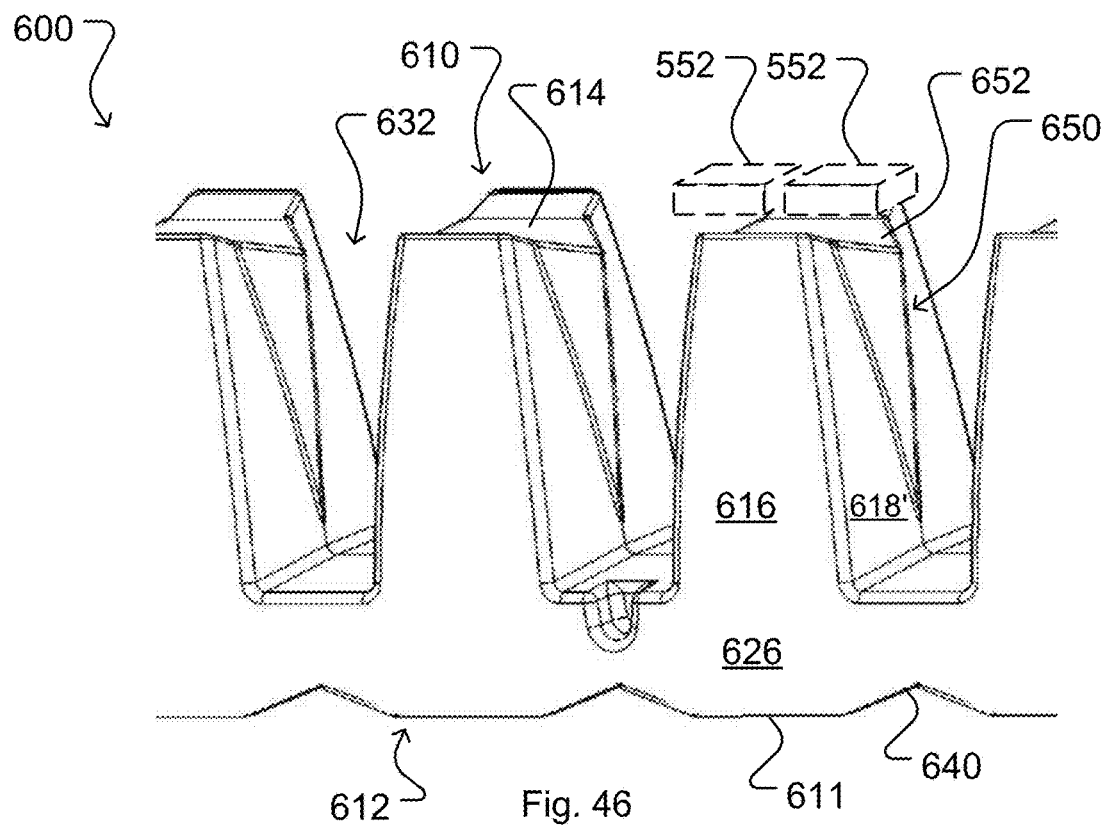
Fig. 46
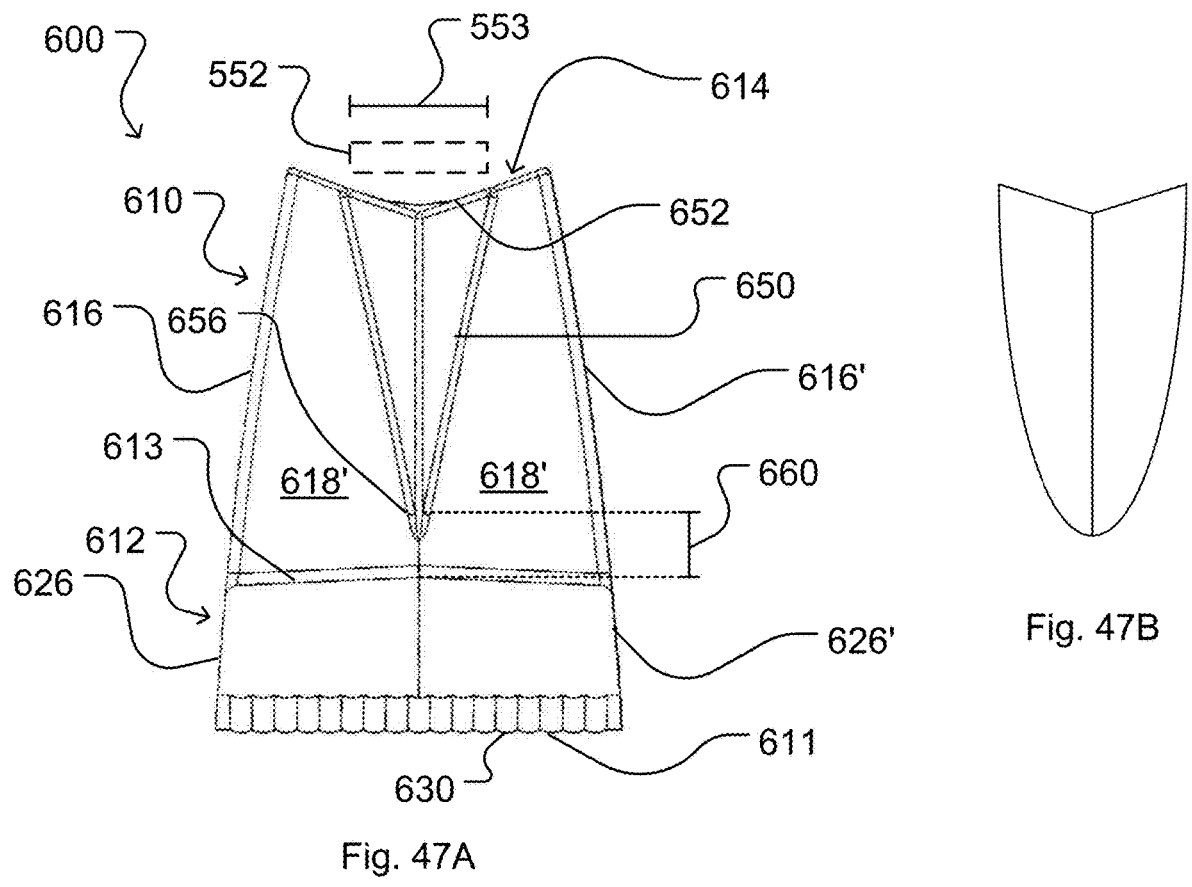
Fig. 47A
Fig. 47B

NARROW APERTURE LUMINAIRES AND LIGHT GUIDES THEREFOR

REFERENCE TO RELATED APPLICATIONS

This application claims the benefit of U.S. provisional patent application No. 63/445,840 filed 15 Feb. 2023, the entirety of which is incorporated by reference herein for all purposes.

TECHNICAL FIELD

This invention relates to luminaires with narrow apertures, and light guides for such luminaires.

BACKGROUND

Point sources of light such as light emitting diodes (LEDs) introduce flexibility but also challenges in the design of architectural luminaires. In some design contexts it is desirable to have luminaires with very narrow channels from which light exits. One challenge in designing such narrow aperture luminaires is minimizing high angle glare while simultaneously outputting sufficient light from the narrow aperture to illuminate a work space. Glare is an effect of luminance at high angles that can cause visual discomfort to users. Another challenge is providing aesthetically pleasing homogenous light at the exit surface, that is, light that appears to be uniform and "clean" despite the fact that the light is coming from point sources of light. Narrow aperture luminaires that reduce or eliminate high angle glare and provide homogenous light are desirable.

SUMMARY

The present invention encompasses various aspects.

One aspect of the invention provides a light guide comprising: an elongated base comprising a light emitting surface at a distal end, and opposing major faces; and a plurality of collimators projecting from the base, wherein each collimator comprises a light receiving surface at a proximal end, wherein the plurality of collimators are arranged with spaces therebetween along the base, wherein the light emitting surface comprises notches having a minimum width corresponding to the space between the collimators and a maximum width corresponding to a space between the light receiving surfaces, whereby substantially all light received at the light receiving surfaces internally reflects through the collimators and the base and emits from the light emitting surface, and whereby the notches are configured to direct light emitted from the light emitting surface at a lower angle than if the notches were not present.

The notches may be upside down V-shaped. An opening angle of each of the notches may be between 90 to 160 degrees. Each collimator may comprise opposing sides, each opposing side comprising a protrusion, wherein an upper face of the protrusion defines a lateral portion of the light receiving surface, and wherein the protrusion tapers distally into a plane of the opposing side at a point along the opposing side at least half a width of a light source for the light guide above the bottom of the collimator. Each collimator may be shaped as a rectangular frustum comprising opposing faces and opposing sides, and wherein the opposing faces of the collimators are continuous with corresponding major faces of the base.

Another aspect provides a luminaire comprising: at least one light guide as described herein; a plurality of light sources in optical communication with the light receiving surfaces; a board onto which the plurality of light sources are mounted; a housing for housing the light guide, the plurality of light sources, and the board. The light sources of the luminaire may comprise light emitting diodes.

Another aspect of the invention provides a light guide comprising: an elongated base comprising a light emitting surface at a distal end, and opposing major faces; and a plurality of collimators arranged in an adjacent manner and projecting from the base, wherein each collimator comprises a light receiving surface at a proximal end, wherein each collimator comprises opposing sides, each opposing side comprising a protrusion, wherein an upper face of the protrusion defines a lateral portion of the light receiving surface, and wherein the protrusion tapers distally into a plane of the opposing side at a point along the opposing side at least half a width of a light source for the light guide above the bottom of the collimator, whereby substantially all light received at the light receiving surfaces internally reflects through the collimators and the base and emits from the light emitting surface.

The upper face of the protrusion may be triangular. A vertex of the upper face may have an angle of 90 to 130 degrees. The protrusion may be shaped as a mirrored sphenoid having triangular cross sections of diminishing size in the proximal to distal direction. The plurality of collimators may be arranged with spaces therebetween along the base, and wherein the light emitting surface comprises notches having a minimum width corresponding to the space between the collimators and a maximum width corresponding to a space between the light receiving surfaces. Each collimator may be shaped as a rectangular frustum comprising opposing faces and the opposing sides, and wherein the opposing faces of the collimators are continuous with corresponding major faces of the base.

Another aspect of the invention provides a luminaire comprising: at least one light guide as described herein; a plurality of light sources in optical communication with the light receiving surfaces; a board onto which the plurality of light sources are mounted; a housing for housing the light guide, the plurality of light sources, and the board.

Each light receiving surface may be associated with a pair of light sources, wherein a combined lateral span of the pair of light sources is substantially equal to a lateral span of the light receiving surface. A width of the light source is substantially equal to a maximum width of the protrusion at the light receiving surface. A distance from the point the protrusion tapers into the plane of the opposing side to the bottom of the collimator is substantially equal to half a width of the light source. The light sources may comprise light emitting diodes.

BRIEF DESCRIPTION OF DRAWINGS

The accompanying drawings illustrate non-limiting example embodiments of the invention.

FIG. 8 is a close up partial top isometric view of a collimator of a light guide according to the embodiment shown in FIG. 5.

FIG. 8A is a close up partial top isometric view of a collimator of a light guide according to an embodiment.

FIG. 9 is a close up partial front view of a light source and a collimator of a light guide according to the embodiment shown in FIG. 5 with exemplary simulated light ray traces.

FIG. 46 is a close up side perspective view of section A from FIG. 42.

FIG. 47A is an end view of a light guide according to the embodiment shown in FIG. 42.

FIG. 47B is an end view of protrusion of a light guide according to an embodiment.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
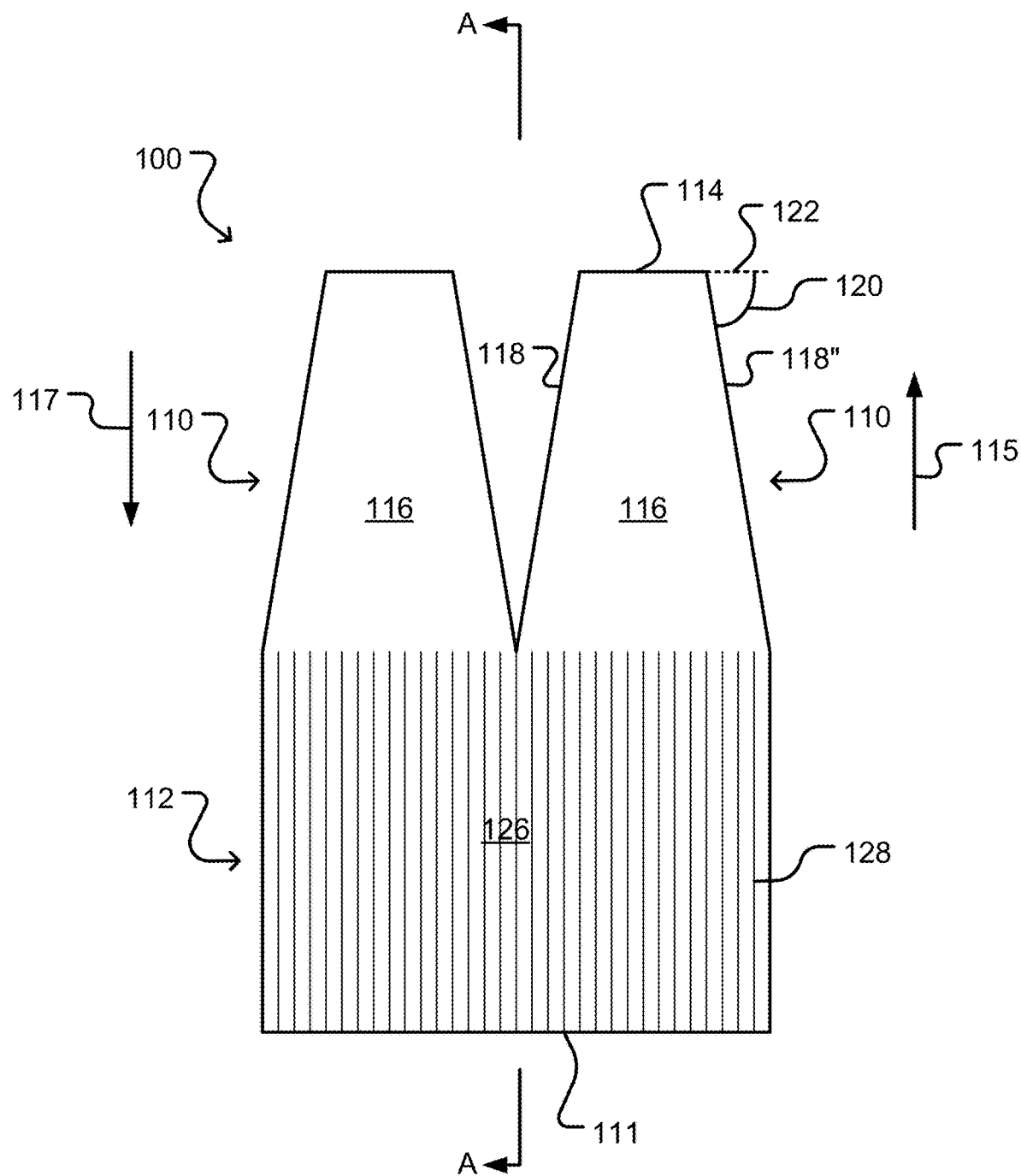
FIG. 1 is a front view of a light guide according to an embodiment.
Figure 2:
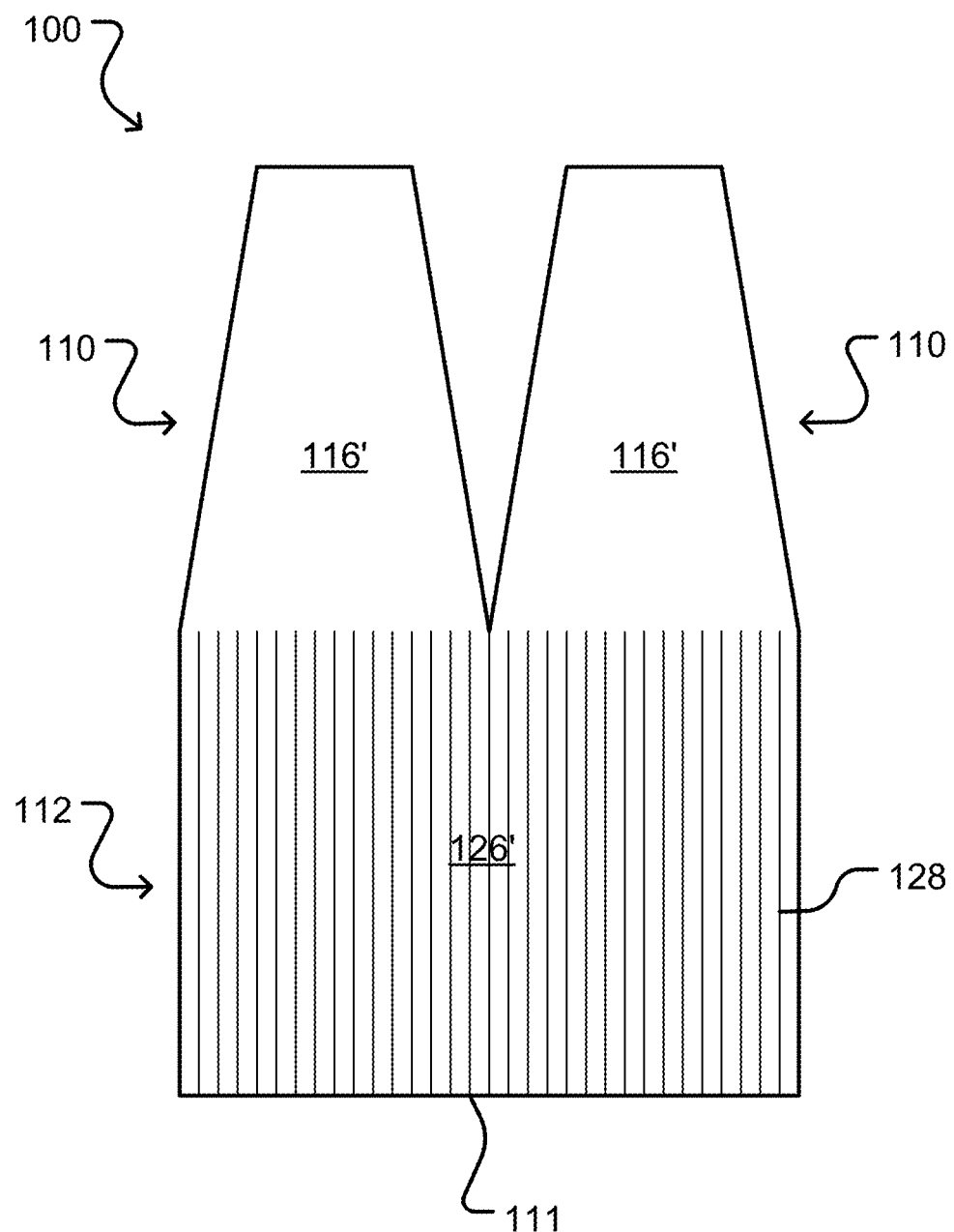
FIG. 2 is a rear view of a light guide according to the embodiment shown in FIG. 1.
Figure 3:
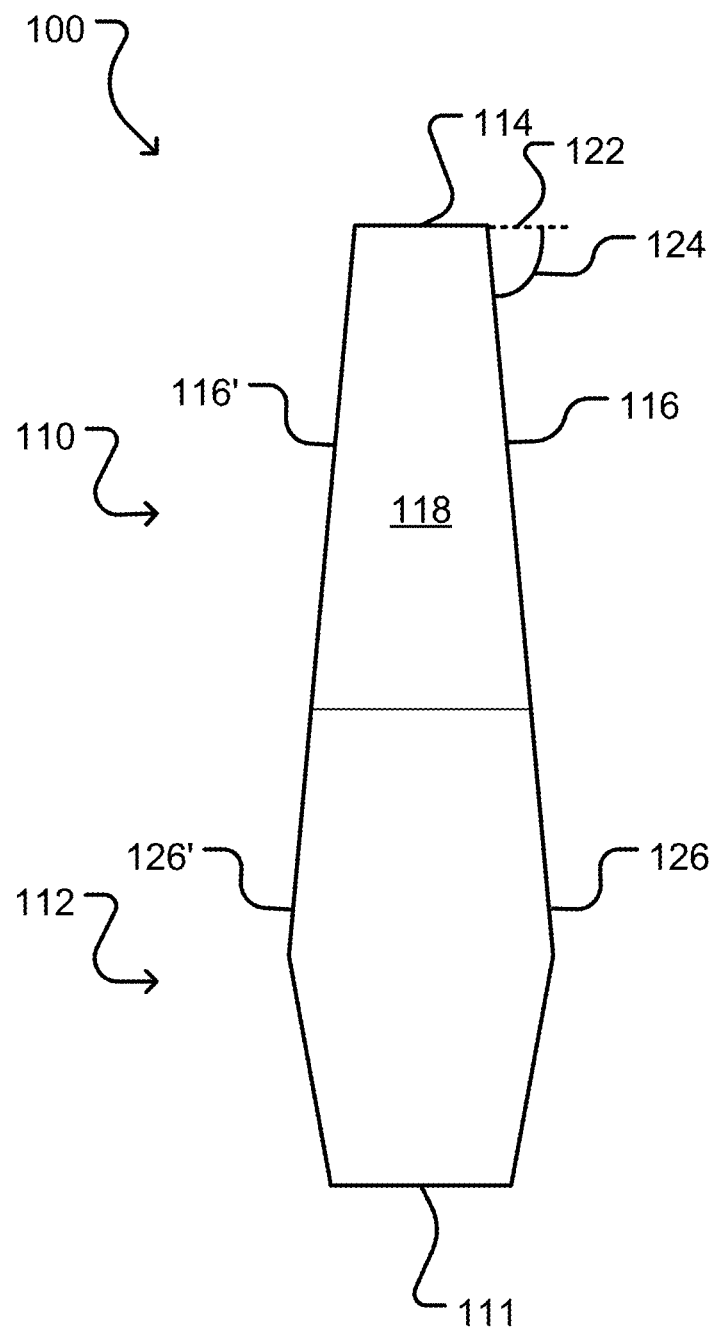
FIG. 3 is a side view of a light guide according to the embodiment shown in FIG. 1 taken along the cross section A-A in FIG. 1.

The term "proximal" as used herein with respect to features of the light guide means a position relatively closer to a plane defined by a light source for the light guide, and the term "distal" as used herein means a position relatively farther away from the plane defined by the light source for the light guide. Arrow 115 in FIG. 1 illustrates the proximal direction, and arrow 117 in FIG. 1 illustrates the distal direction.

The term "longitudinal" or "longitudinally" as used herein with respect to features of the light guide means a direction or orientation parallel to the proximal/distal axis, and the term "lateral" or "laterally" as used herein with respect to features of the light guide means a direction or orientation normal to the proximal/distal axis.

Aspects of the invention relate to light guides having a plurality of collimators projecting from an elongated base. The collimators reduce the angle of light. The base has flutes which homogenize light. Additional features described herein also reduce the angle of light and homogenize light. Aspects of the invention also relate to luminaires incorporating such light guides.

Figure 39:
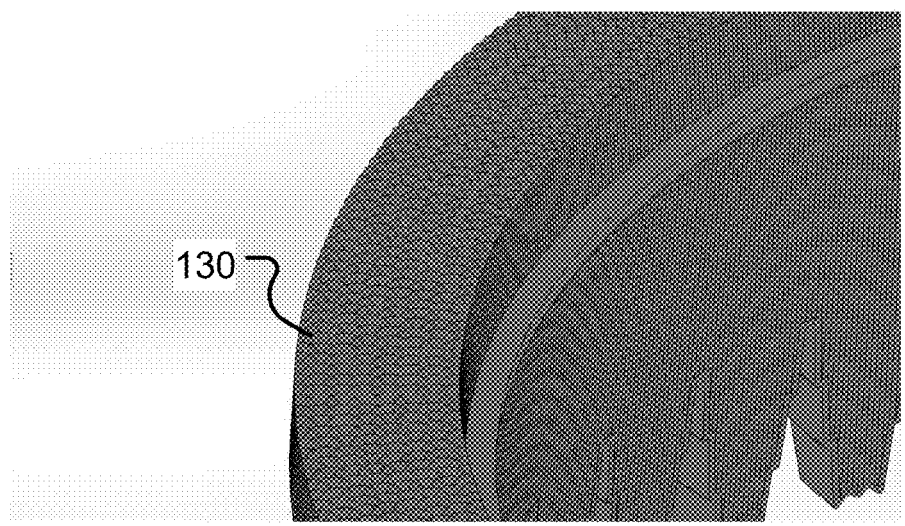
FIG. 39 is a partial bottom isometric view of a light guide according to an embodiment, showing the cross-hatched texture elements of the light emitting surface.
Figure 40A:
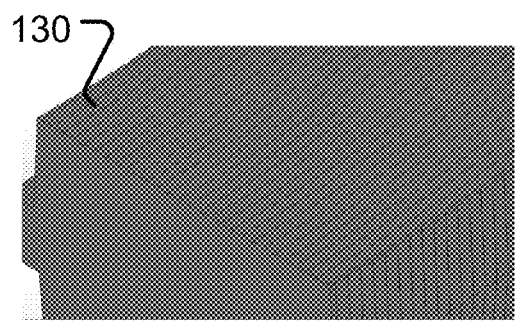
FIGS. 40A and 40B are partial bottom isometric views of light guides according to embodiments, showing circumferentially fluted and radially fluted texture elements of the light emitting surface.
Figure 40B:
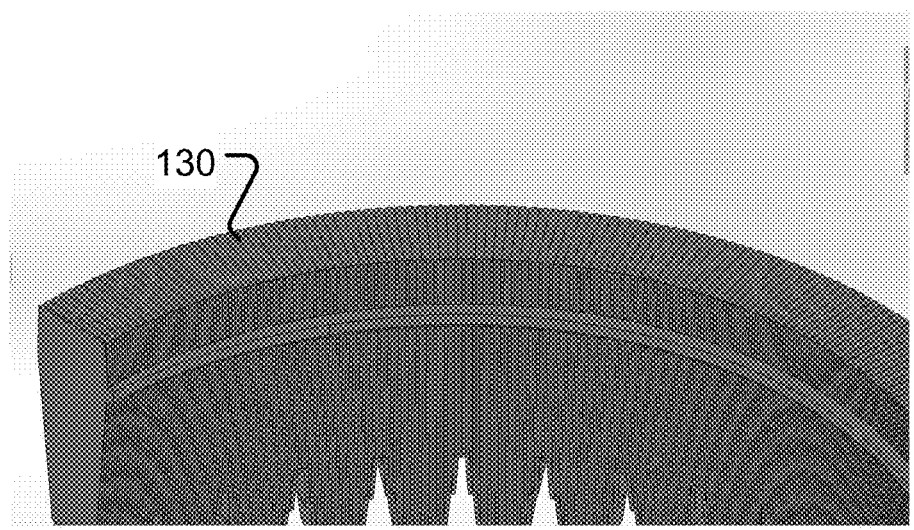

FIGS. 1 to 4 show a light guide 100 according to an embodiment of the invention. Light guide 100 has a plurality of collimators 110 and a laterally elongated base 112. Collimator 110 has a light receiving surface 114 at its proximal end. Base 112 has a light emitting surface 111 at its distal end. As described herein, substantially all light received at light receiving surface 114 of collimators 110 internally reflects through collimators 110 and base 112 and is emitted from light emitting surface 111. In some embodiments light emitting surface may comprise texture elements 130, for example dimples, bumps, flutes (e.g. running parallel or perpendicular to the lateral extent of base 112), or cross-hatched flutes, as shown for example in FIGS. 39, 40A and 40B.

Collimators 110 project from base 112 in a proximal direction 115. Collimators 110 are arranged in a side-by-side immediately adjacent manner along base 112. Collimators 110 and base 112 may be integrally formed and have a unitary structure.

Light guide 100 is shown with two collimators 110 to conveniently illustrate details. In most embodiments the light guide has a base that would be more elongated laterally (either linearly or in any other manner), and would comprise a correspondingly greater number of collimators, for example to provide sufficient length for the light guide to conform to a desired shape and size of the luminaire (e.g. the embodiments shown in FIGS. 5, 15, 25 and 42). Light guides of the present invention, viewed from above or below, may be linear, curved, circular, polygonal or any other open or closed shape. In some embodiments, the light guide may have at least 20, or at least 40, or at least 60 or at least 80, or at least 100, collimators. In some embodiments a plurality of identically-shaped and/or differently-shaped light guides may be combined to the desired shape and size of the luminaire.

Collimators 110 may be identical in size and shape. Collimator 110 has a rectangular frustum shape that expands laterally outwardly in a distal direction 117. Collimator 110 comprise a pair of opposing faces 116, 116' and a pair of opposing sides 118, 118'.

Figure 4:
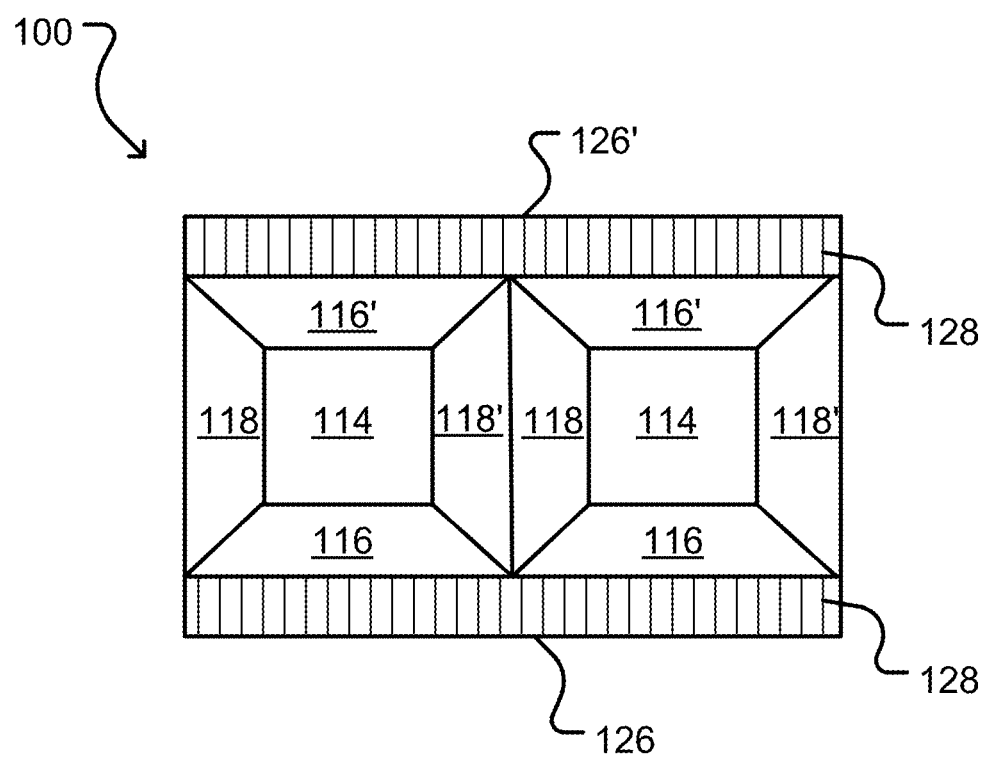
FIG. 4 is a top view of a light guide according to the embodiment shown in FIG. 1.
Figure 5:
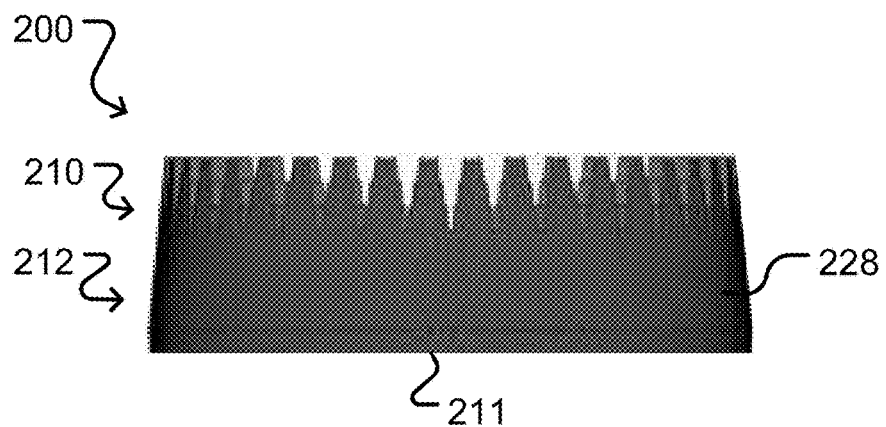
FIG. 5 is a front view of a light guide according to an embodiment.
Figure 6:
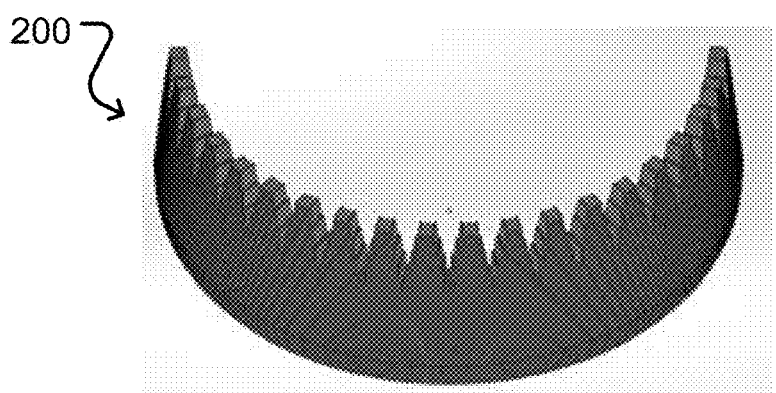
FIG. 6 is a top isometric view of a light guide according to the embodiment shown in FIG. 5.
Figure 7:
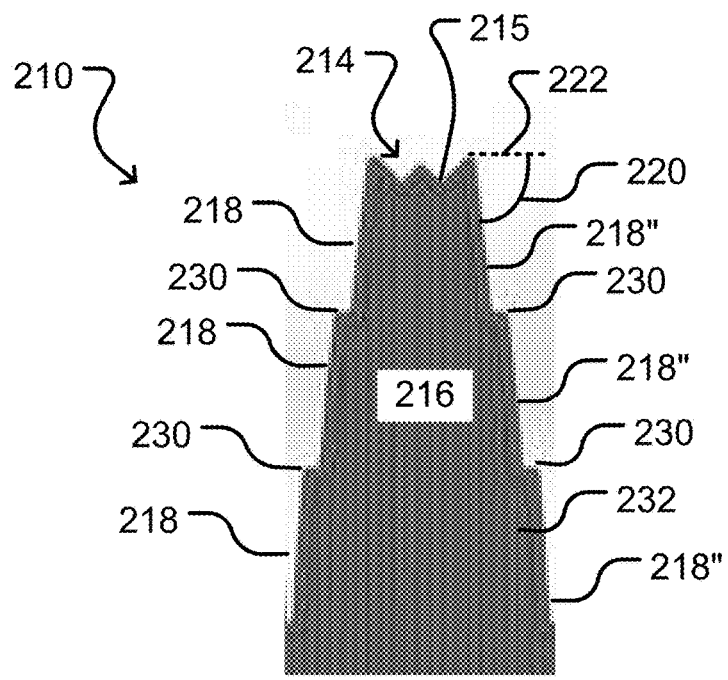
FIG. 7 is a close up front view of a collimator of a light guide according to the embodiment shown in FIG. 5.
Figure 10:
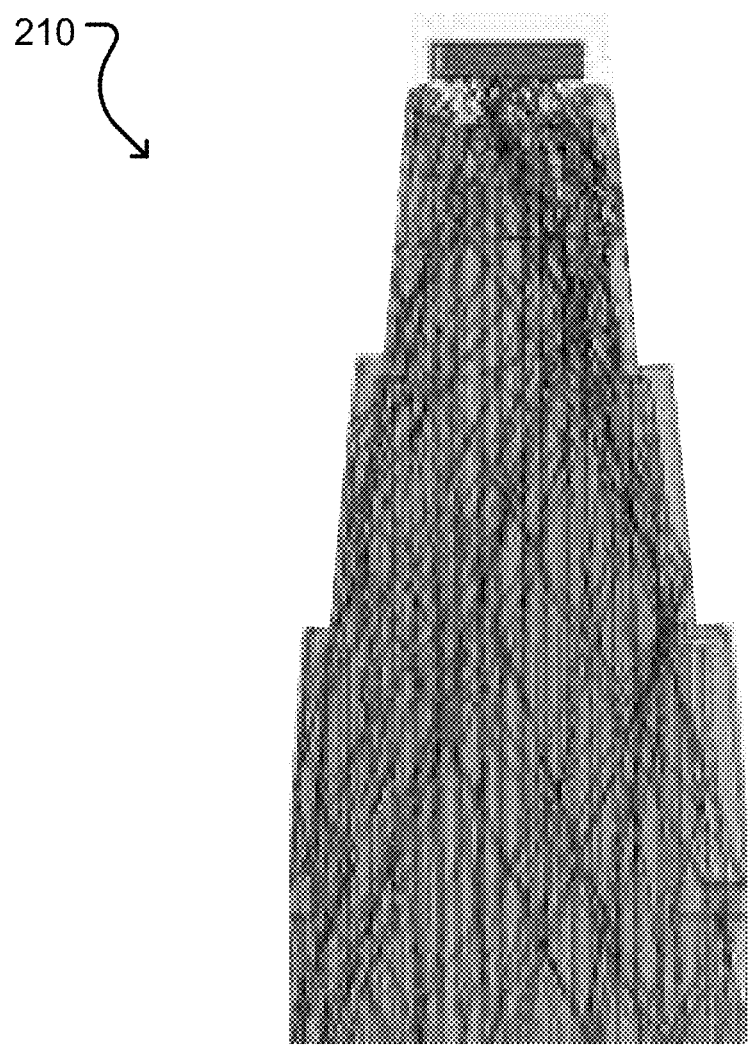
FIG. 10 is a front view of a light source and a collimator of a light guide according to the embodiment shown in FIG. 5 with exemplary simulated light ray traces.
Figure 11:
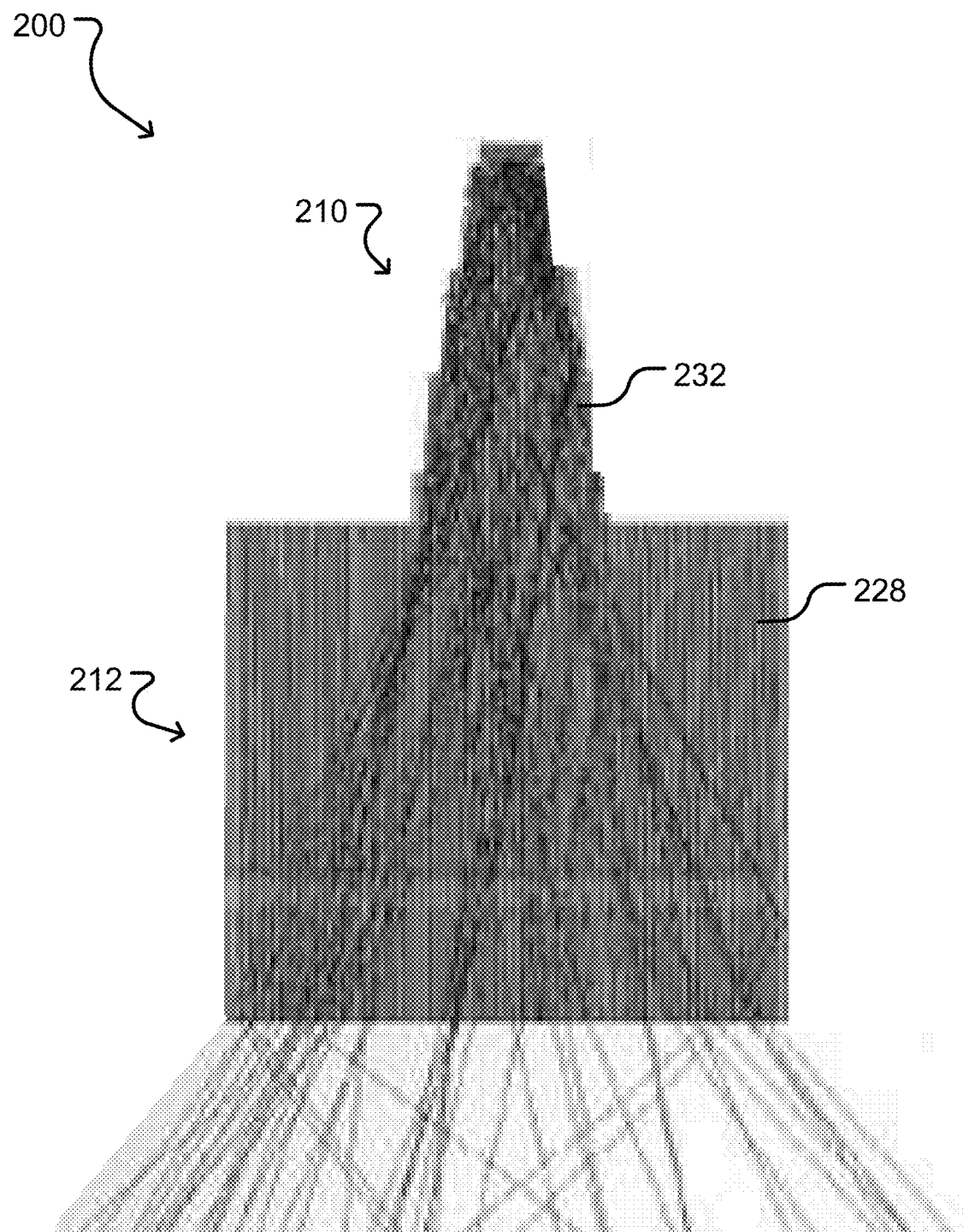
FIG. 11 is a front view of a light source and a light guide according to the embodiment shown in FIG. 5, showing for purposes of illustration a single collimator with exemplary simulated light ray traces.
Figure 12:
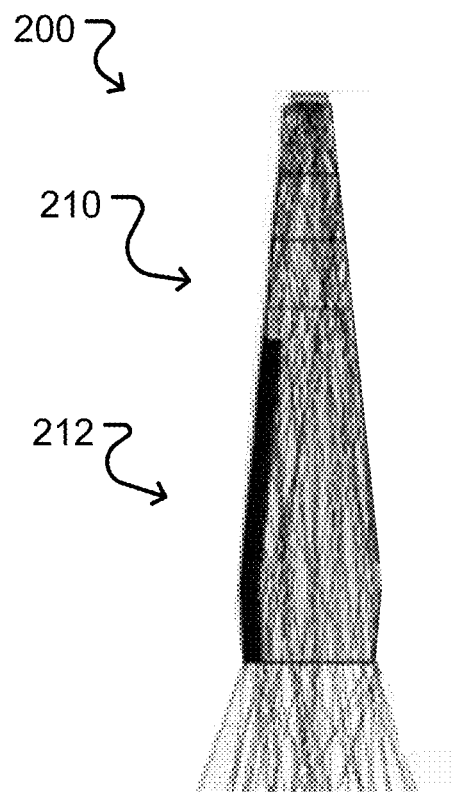
FIG. 12 is an cross sectional side view of a light source and a light guide according to the embodiment shown in FIG. 5, with exemplary simulated light ray traces (the solid black strip along the left of the light guide being an artefact that should be ignored).

FIG. 1 shows the angle 120 of opposing sides 118, 118' relative to a plane 122 defined by light receiving surface 114. FIG. 4 shows the angle 124 of opposing faces 116, 116' relative to a plane 122 defined by light receiving surface 114. Angles 120 and 124 may be affected by a number of factors including:

Collimator path length. Depending on the specific goal of the design, a longer path length of the collimator would allow for more collimation and angles 120 and 124 would be adjusted accordingly.

Mechanical aperture of the exit surface. If one of the directions has a narrower housing aperture that the light is exiting from, that direction's collimation would need to be stronger to prevent light from being cut off.

Desired beam output. Where the luminaire/light guide is linear, it may be desirable to have a batwing beam pattern form along the width (controlled by angle 124) but a tighter beam pattern along the length to reduce the glare for the occupants (controlled by angle 120).

Manufacturing constraints. Even if an angle of 90 degrees is desired, a minimum draft angle may be needed for manufacturing such as injection molding.

In some embodiments, angles 120 and 124 are not equal. This may be due to the path length difference between the two orientations caused by base 112, that is, light affected by angle 124 experiences more reactions (interacting with opposing faces 116, 116' and major surfaces 126, 126') while light affected by angle 120 primarily only interacts with opposing sides 118, 118'.

In some embodiments angle 120 may range from 82 to 89.9 degrees, or from 80 to 89.9 degrees, or from 75 to 89.9 degrees. In some embodiments angle 124 may range from 80 to 89.9 degrees. In some embodiments angle 120 and angle 124 are identical. In other embodiments angle 120 and angle 124 differ.

Base 110 is rectangular and laterally elongated, for example in a manner dictated by the desired shape of the luminaire, that is, linear, curved, circular, polygonal or any other open or closed shape. Base 110 has opposing major faces 126, 126' with longitudinally extending flutes 128. Major faces 126, 126' of base 110 may be continuous with, and may be at least partially coplanar with, corresponding opposing faces 116, 116' of collimators 110.

In operation, substantially all light received at light receiving surface 114 travels by total internal reflection through collimators 110 and base 112 before refracting out of light emitting surface 111. Light internally reflects through collimators 110 at progressively lower angles. Higher angle light travelling through collimators 110 are reflected a greater number of times than lower angle light. Since each reflection bends light a small amount toward a lower angle, higher angle light experiencing more reflections will be bent more toward lower angles than light initially received at lower angles. Thus light reflecting through collimators 110 ends up at similar angles below the glare zone as the light refracts out of light emitting surface 111. Some lower angle light may not experience any internal reflections within light guide 100.

Flutes 128 on major faces 126, 126' of base 112 homogenize light, as described for example in U.S. Pat. No. 10,215,344, incorporated by reference herein in its entirety. Since flutes 128 are contoured in directions (e.g. for FIG. 1, into and out of the page) which are perpendicular to the internal reflections by collimators 110, the effect of flutes 128 does not significantly interfere with the glare control effect of collimators 110. Texture elements 130 at light emitting surface 111 further homogenize light exiting light guide 100, as well as homogenizes the appearance of light emitting surface 111.

FIGS. 5 to 9 show a light guide 200 according to an embodiment of the invention. Light guide 200 extends laterally in a semi-circular shape. In an example embodiment, two light guides 200 can be combined to form an annulus light guide for an annular luminaire. In some embodiments light guide 200 may extend laterally in any other length or shape.

Light guide 200 is similar to light guide 100 but is an example embodiment configured to emit a wide distribution. In some embodiments the wide distribution may be at least 50 degrees. In particular, light receiving surface 214 of light guide 200 has a plurality of V-shaped grooves 215. The embodiment illustrated in FIGS. 5 to 9 has 2 V-shaped grooves 215. In other embodiments, light receiving surface 214 may have 3 or more V-shaped grooves 215. V-shaped grooves 215 may span the entirety of light receiving surface 214. V-shaped grooves 215 may run normal to the plane of opposing faces 216, 216' of collimator 210. In other embodiments, V-shaped grooves 215 may run parallel to the plane of opposing faces 216, 216' of collimator 210.

In some embodiments, as shown in FIG. 58A, V-shaped grooves 215 may be provided with flutes 217 running perpendicular to the direction in which V-shaped grooves 215 run.

Light guide 200 also includes longitudinally extending flutes 232 on opposing faces 216, 216' of collimator 210. Flutes 232 of collimators 210 may be continuous with corresponding flutes 228 of base 212.

Opposing sides 218, 218' of collimator 210 expand laterally in a stepped manner at a plurality of opposing steps 230. Steps 230 along each opposing side 218, 218' may be identical in shape and spaced equally apart. In some embodiments, angle 220 may be 82 to 89.9 degrees.

The inventors have determined that V-shaped grooves 215 split directional light from an light emitting diode (LED) into internally reflected batwing distributions parallel to light guide 200's lateral extent (e.g. circumference in the case of light guide 200's particular shape). Light from LEDs comprises various colours (i.e., wavelengths) depending on where it leaves the phosphor face of the LED. In particular, the colour transitions from cool to warm from the center to the edges of the phosphor face of the LED. Different sides of the "V" of V-shaped grooves 215 can operate on different areas of the phosphor face. For example, in the illustrated embodiment of a double "V", the two inner sides of the "VV" create a cooler batwing distribution flanked by the two outer sides of the "VV" which create a warmer batwing distribution. The cooler and warmer batwing distributions mix inside light guide 100 to homogenize the colours. Flutes 217 provide further homogenization of the colours.

The inventors have determined that, since the contours of flutes 228 of base 212 and flutes 232 of collimator 210 run perpendicular to the contours of V-shaped grooves 215, flutes 228, 232 provide additional homogenization of the optical distribution in a normal direction to V-shaped grooves 215.

The inventors have determined that steps 230 of collimators 210 provide at least three functions: (i) to divide sections of light guide 200 into smaller, thin rectangular sections to eliminate the visual appearance of louver sections on light emitting surface 211 created by the imaging of individual collimators 210; (ii) to allow angles of each such section to be independently specified to optimize the optical distribution which runs parallel to light guide 200's lateral extent; and (iii) to control light rays so that collimators 210 turn on and off similar angles through the entire extent of collimators 210, minimizing intermittent "drop outs" along the lateral extent of light guide 200.

FIGS. 9 to 12 illustrate exemplary simulated ray traces of light of multiple ray reactions. Rays are shown to internally reflect down to lower angles in the proximal to distal direction. Lower angle rays typically reflect once while higher angle rays are reflected multiple times. Each reflection results in the rays bending to lower angles.

Figure 13:
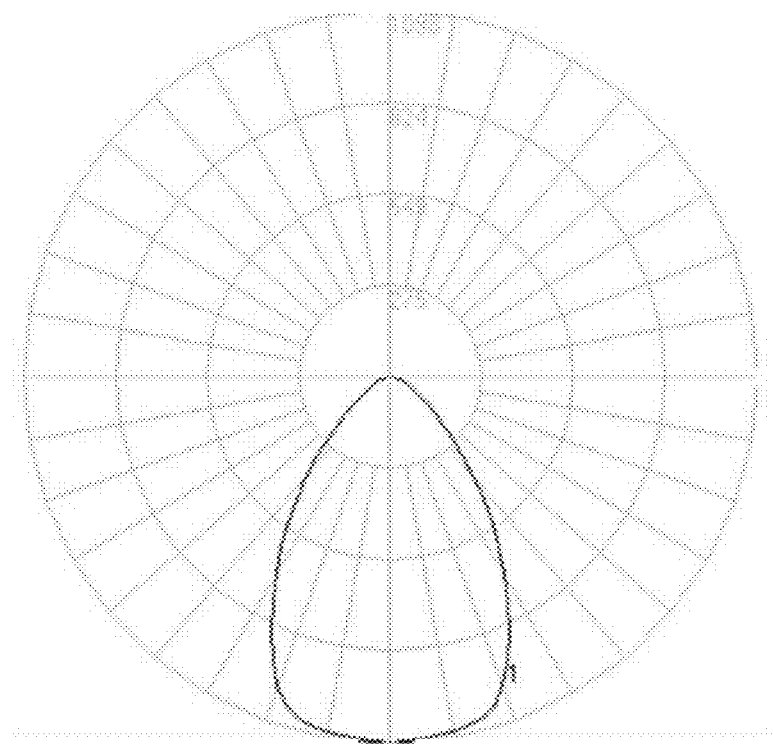
FIG. 13 is an optical distribution plot of exemplary simulated light rays emitted from a light guide according to the embodiment shown in FIG. 5.
Figure 14A:
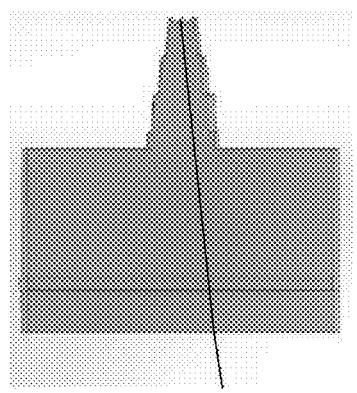
FIGS. 14A to 14H show exemplary simulated ray traces of light internally reflecting and then refracting out a light guide according to the embodiment shown in FIG. 5, when a single light ray enters the light receiving surface at the following incident angles: 14A at 0 degrees, 14B at 10 degrees, 14C at 20 degrees, 14D at 30 degrees, 14E at 40 degrees, 14F at 50 degrees, 14G at 60 degrees and 14H at 70 degrees.
Figure 14B:
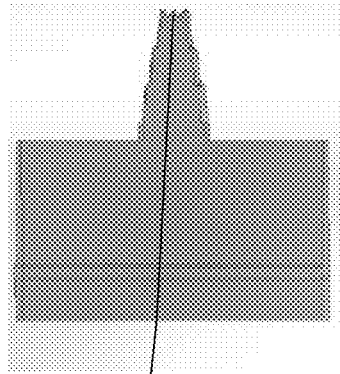
Figure 14C:
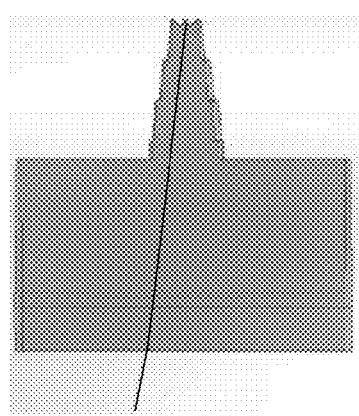
Figure 14D:
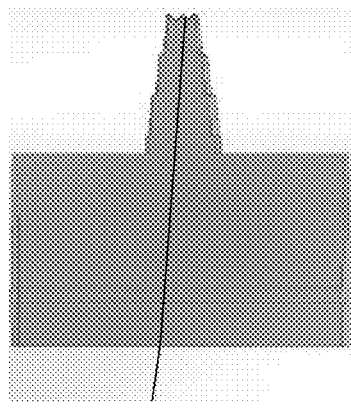
Figure 14E:
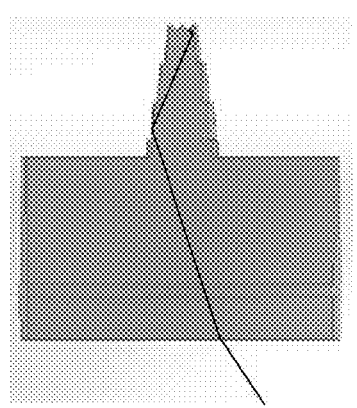
Figure 14F:
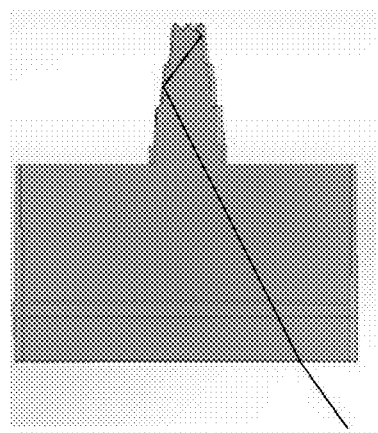
Figure 14G:
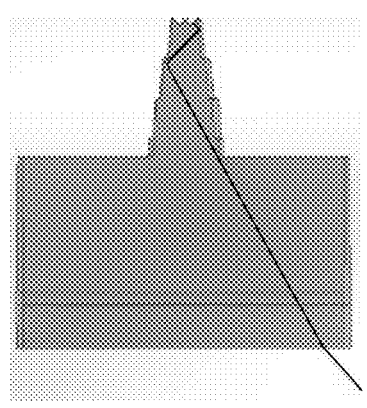
Figure 14H:
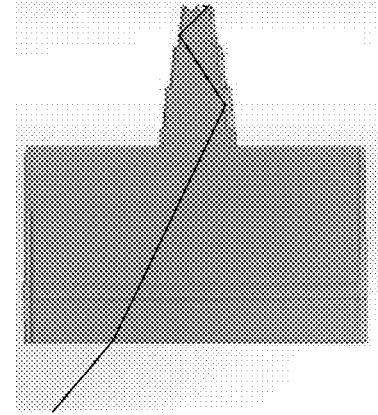
Figure 15:
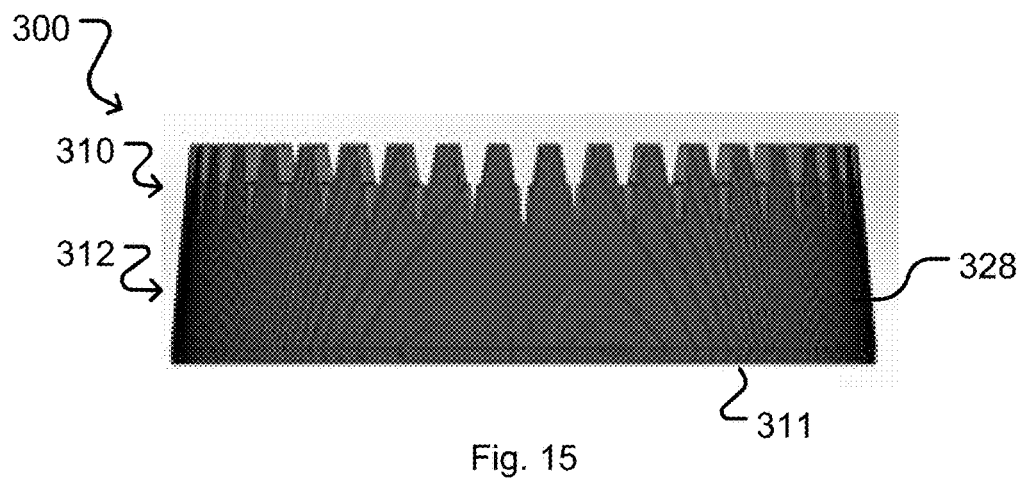
FIG. 15 is a front view of a light guide according to an embodiment.
Figure 16:
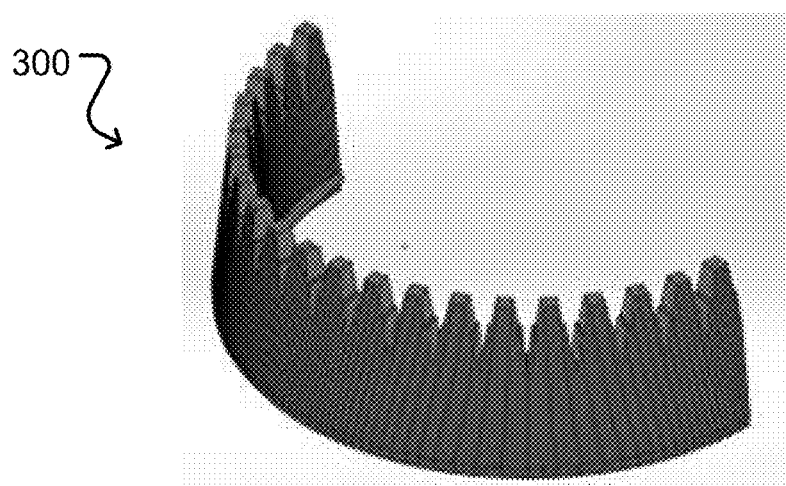
FIG. 16 is a top isometric view of a light guide according to the embodiment shown in FIG. 15.
Figure 17:
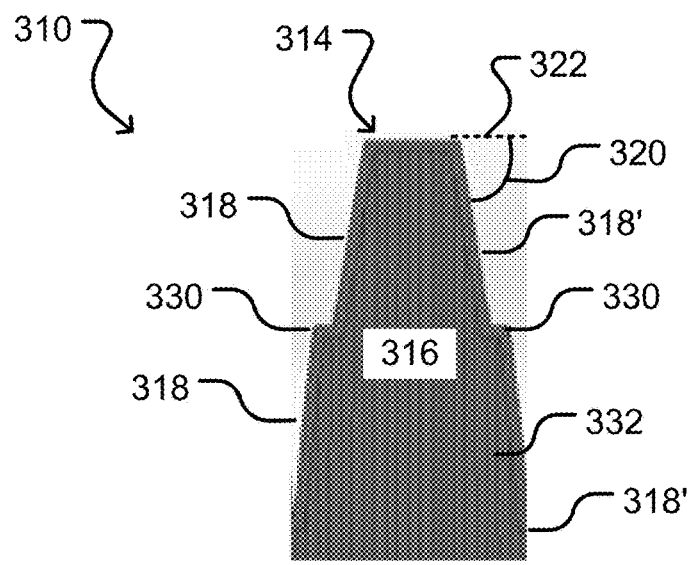
FIG. 17 is a close up front view of a collimator of a light guide according to the embodiment shown in FIG. 15.
Figure 18:
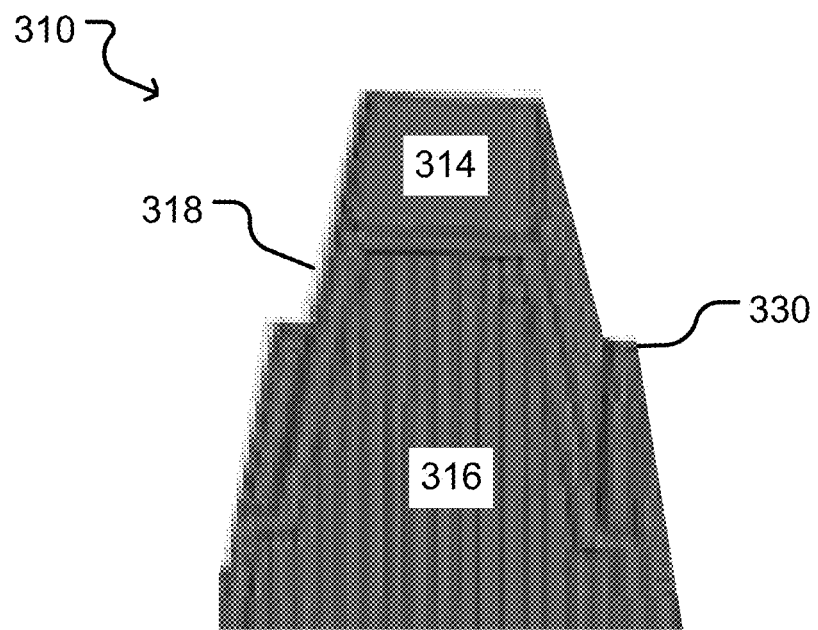
FIG. 18 is a close up partial top isometric view of a collimator of a light guide according to the embodiment shown in FIG. 15.
Figure 19:
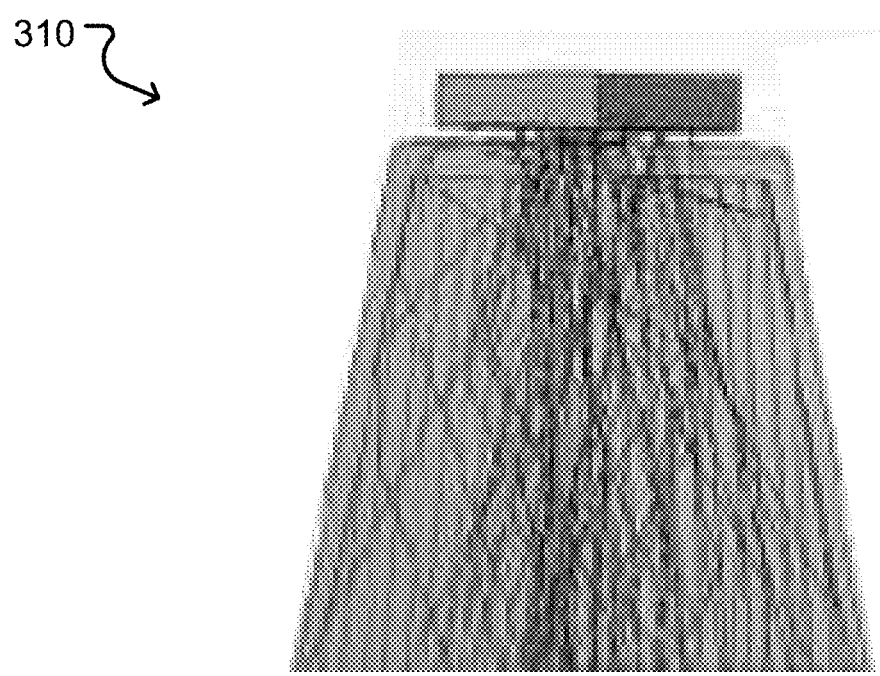
FIG. 19 is a close up partial front view of a light source and a collimator of a light guide according to the embodiment shown in FIG. 15 with exemplary simulated light ray traces.
Figure 20:
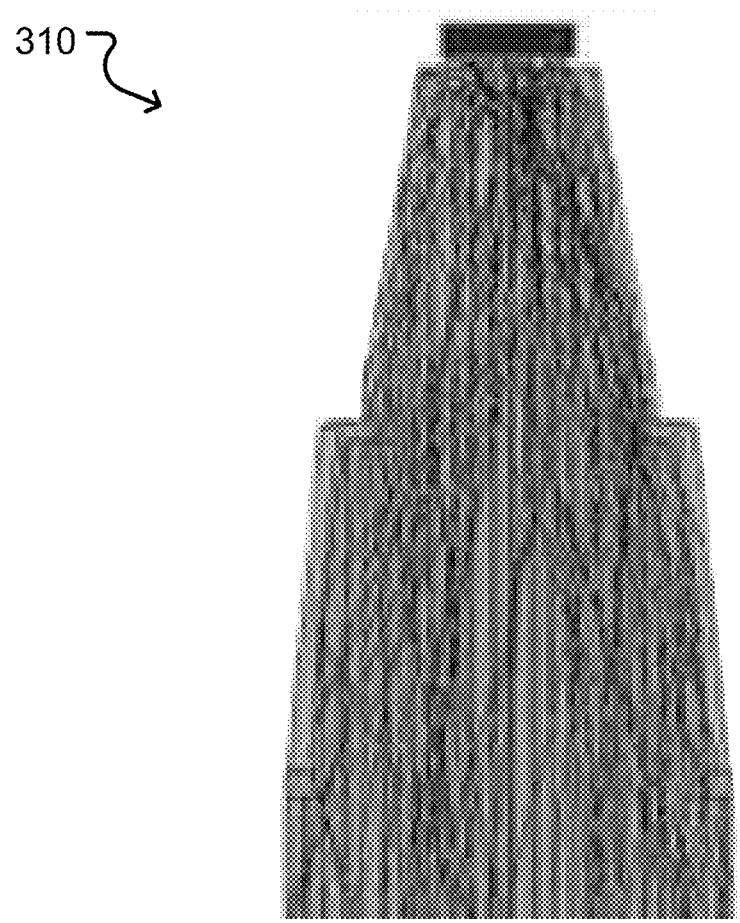
FIG. 20 is a front view of a light source and a collimator of a light guide according to the embodiment shown in FIG. 15 with exemplary simulated light ray traces.
Figure 21:
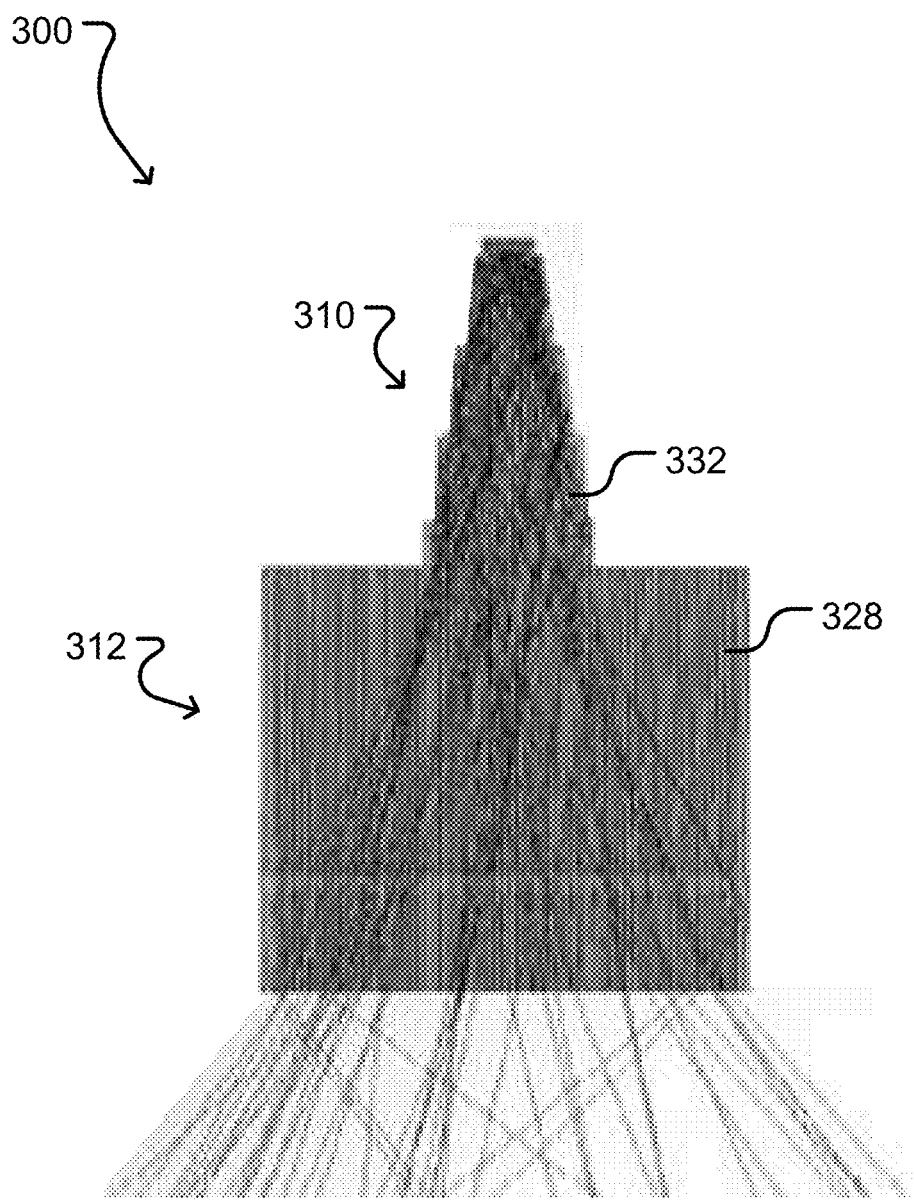
FIG. 21 is a front view of a light source and a light guide according to the embodiment shown in FIG. 15, showing for purposes of illustration a single collimator with exemplary simulated light ray traces.
Figure 22:
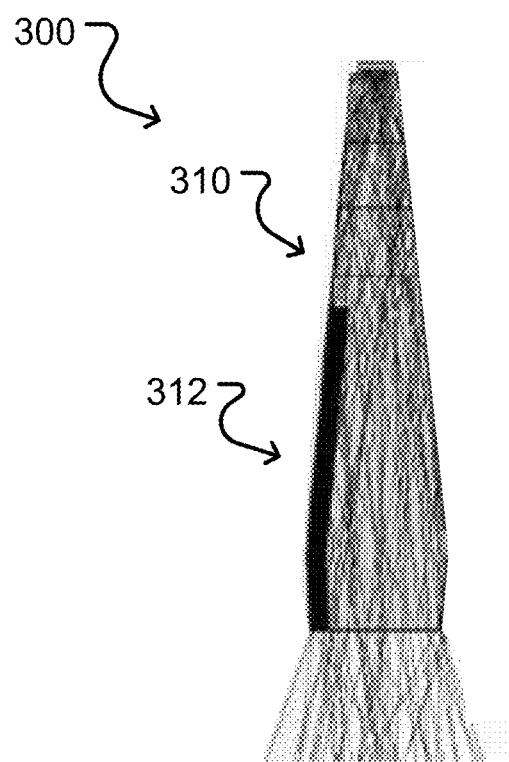
FIG. 22 is an cross sectional side view of a light source and a light guide according to the embodiment shown in FIG. 15, with exemplary simulated light ray traces (the solid black strip along the left of the light guide being an artefact that should be ignored).

The optical distribution of these reactions is plotted in FIG. 13, showing a desirable distribution with peak angles at approximately 10 to 20 degrees for a wide distribution.

FIGS. 14A to 14H show exemplary simulated ray traces of light emitted from light guide 200 of a single ray reaction, where the ray enters light guide 200 from various angles from 0 to 70 degrees. From 0 to 30 degrees (FIGS. 14A to 14D), the light ray is refracted at the light receiving surface at inner sides of the "VV" grooves and travels down the light guide until it refracts out of the light emitting surface. From 40 to 70 degrees (FIGS. 14E to 14H), the light ray is refracted at the light receiving surface at outer sides of the "VV" grooves, causing the ray to enter light guide 100 at a higher angle. As this angle is higher, the ray internally reflects multiple times within the collimator, reducing its angle, and then refracts out of the light emitting surface.

FIGS. 15 to 18 show a light guide 300 according to an embodiment of the invention. Light guide 300 is similar to light guide 200 but is an example embodiment configured to emit a medium distribution. In some embodiments the medium distribution may be approximately 30 to 50 degrees.

In particular, light receiving surface 314 of light guide 300 has a flat surface. The inventors have determined that V-shaped grooves are not necessary for a medium distribution because a medium distribution does not require light to be redirected or spread at the light receiving surface. With a flat surface, light maintains a Lambertian distribution as it enters light receiving surface 314.

Like light guide 200, light guide 300 has a plurality of collimators 310 with opposing faces 316, 316', opposing sides 318, 318', collimator steps 330 and collimator flutes 332. In some embodiments, angle 320 may be 80 to 89.9 degrees. Light guide 300 also has a base 312 with light emitting surface 311 and flutes 328.

FIGS. 19 to 22 illustrate exemplary simulated ray traces of light of multiple ray reactions. Rays are shown to internally reflect down to lower angles in the proximal to distal direction. Lower angle rays typically reflect once while higher angle rays are reflected multiple times. Each reflection results in the rays bending to lower angles.

Figure 23:
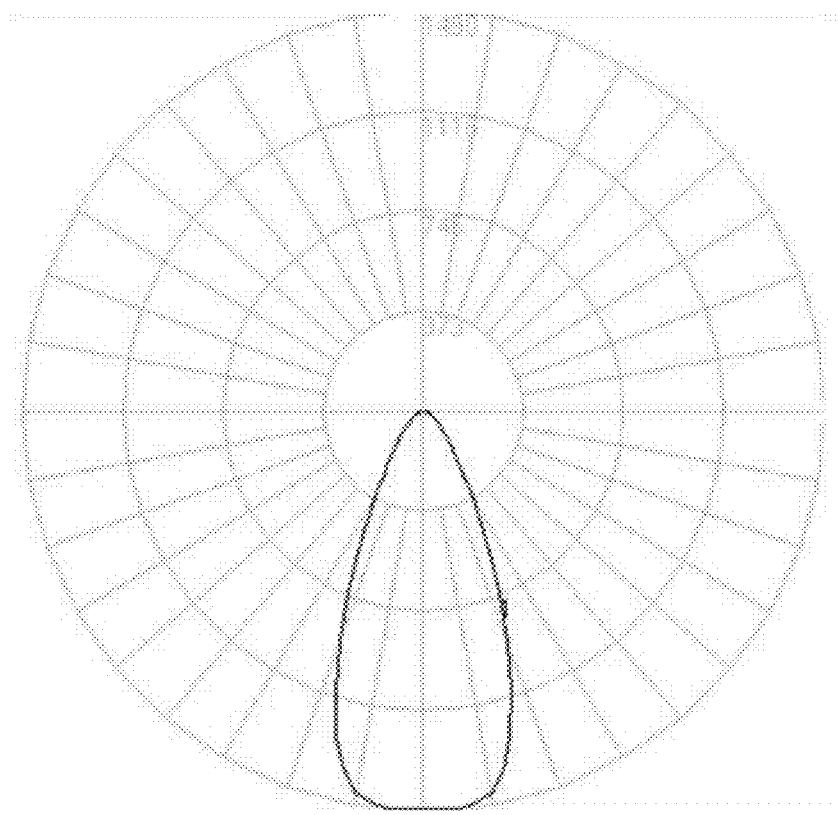
FIG. 23 is an optical distribution plot of exemplary simulated light rays emitted form a light guide according to the embodiment shown in FIG. 15.
Figure 24A:
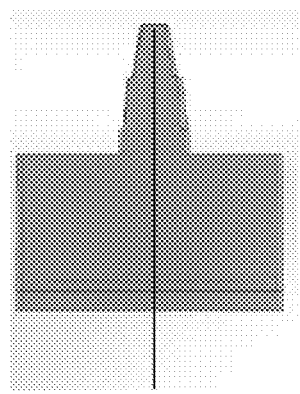
FIGS. 24A to 24H show exemplary simulated ray traces of light internally reflecting and then refracting out a light guide according to the embodiment shown in FIG. 15, when a single light ray enters the light receiving surface at the following incident angles: 24A at 0 degrees, 24B at 10 degrees, 24C at 20 degrees, 24D at 30 degrees, 24E at 40 degrees, 24F at 50 degrees, 24G at 60 degrees and 24H at 70 degrees.
Figure 24B:
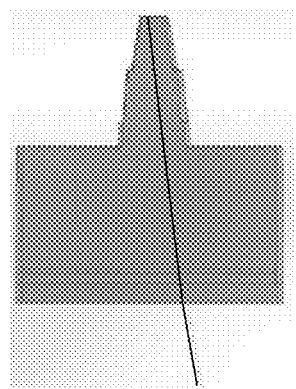
Figure 24C:
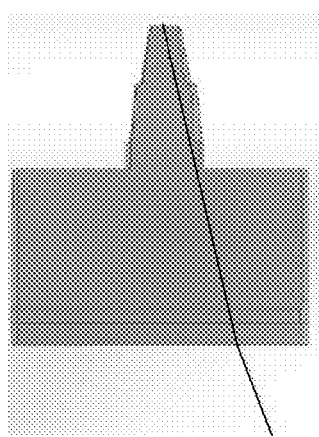
Figure 24D:
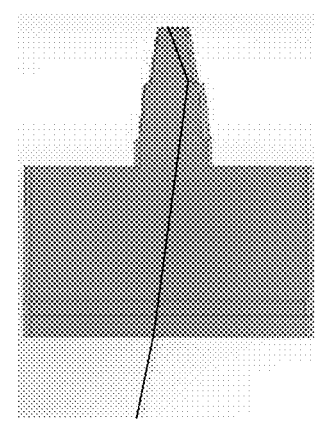
Figure 24E:
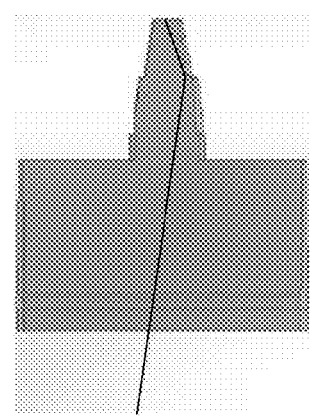
Figure 24F:
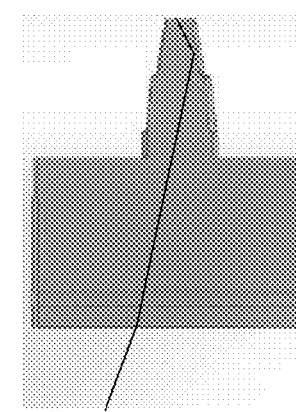
Figure 24G:
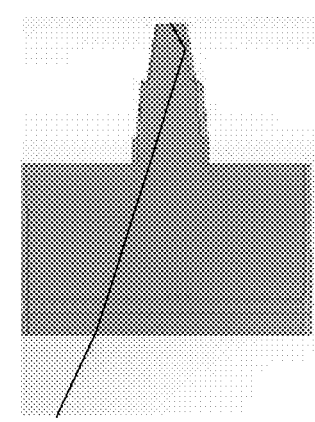
Figure 24H:
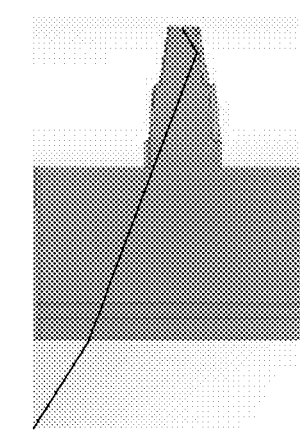
Figure 25:
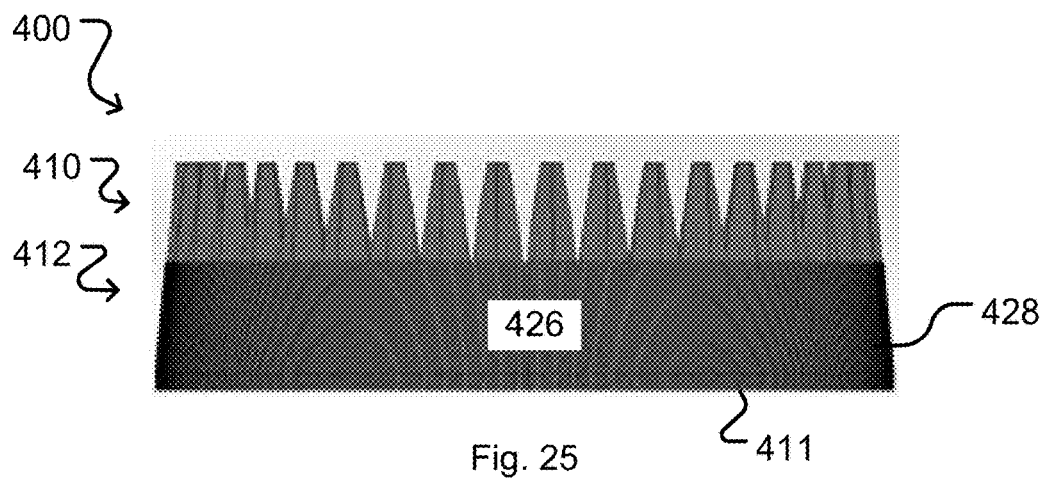
FIG. 25 is a front view of a light guide according to an embodiment.
Figure 26:
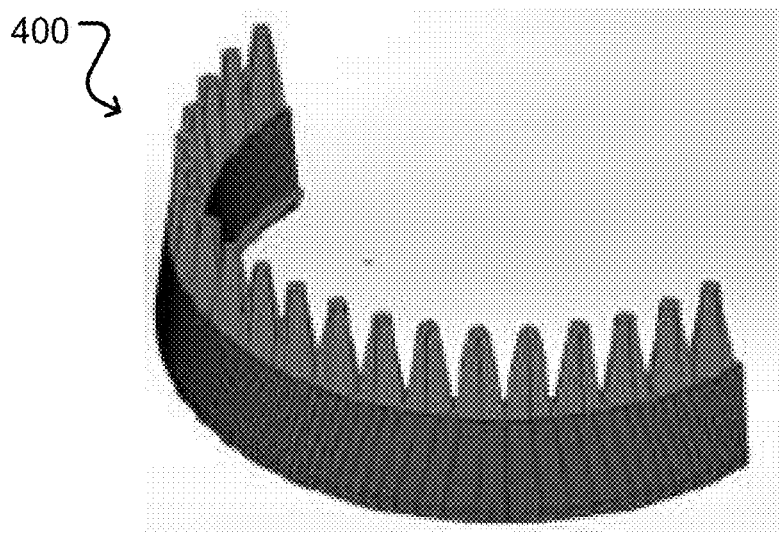
FIG. 26 is a top isometric view of a light guide according to the embodiment shown in FIG. 25.
Figure 27:
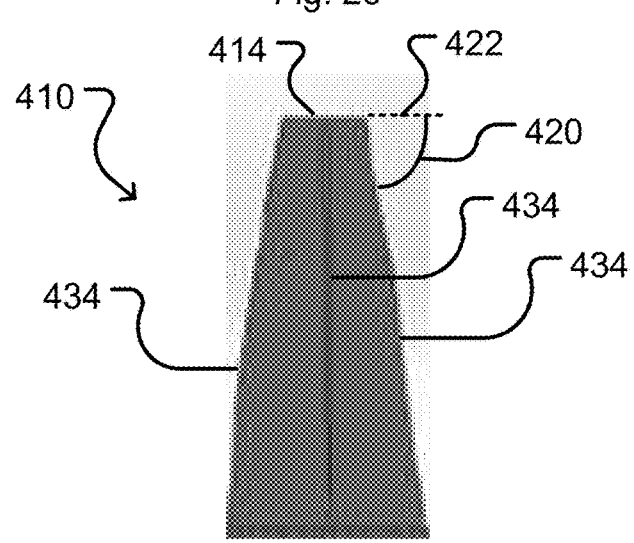
FIG. 27 is a close up front view of a collimator of a light guide according to the embodiment shown in FIG. 25.
Figure 28:
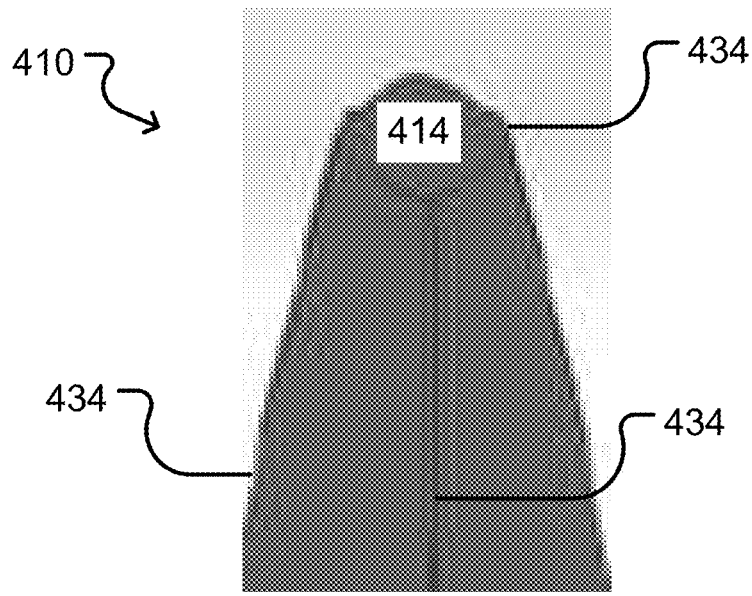
FIG. 28 is a close up partial top isometric view of a collimator of the light guide according to the embodiment shown in FIG. 25.
Figure 29:
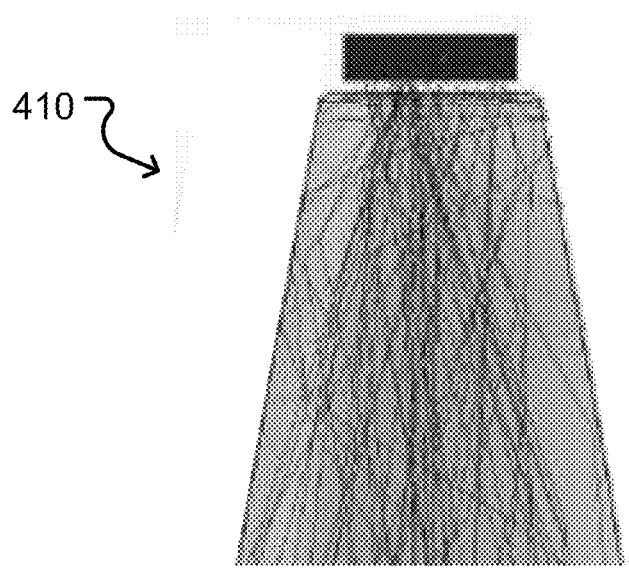
FIG. 29 is a close up partial front view of a light source and a collimator of a light guide according to the embodiment shown in FIG. 25 with exemplary simulated light ray traces.
Figure 30:
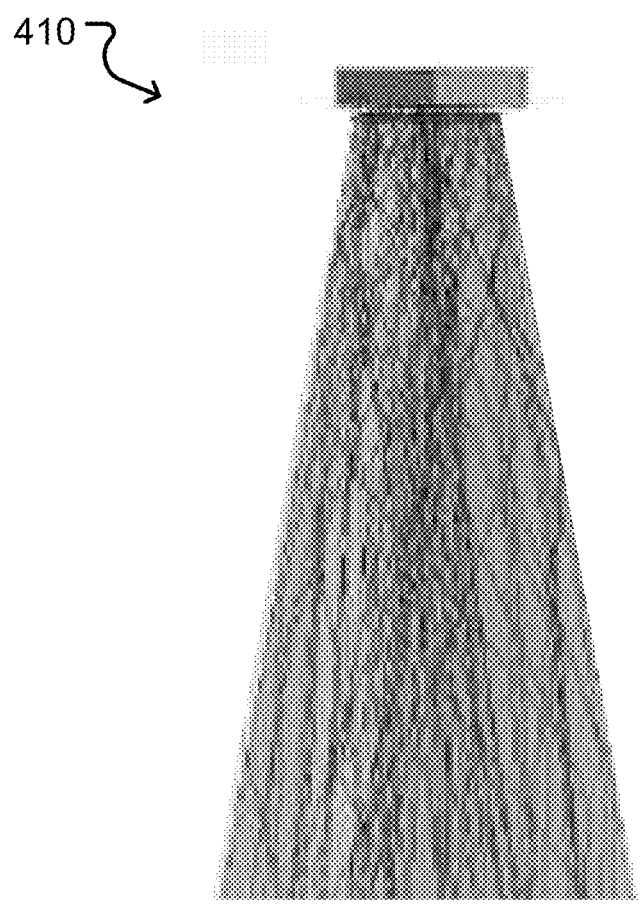
FIG. 30 is a front view of a light source and a collimator of a light guide according to the embodiment shown in FIG. 25 with exemplary simulated light ray traces.
Figure 31:
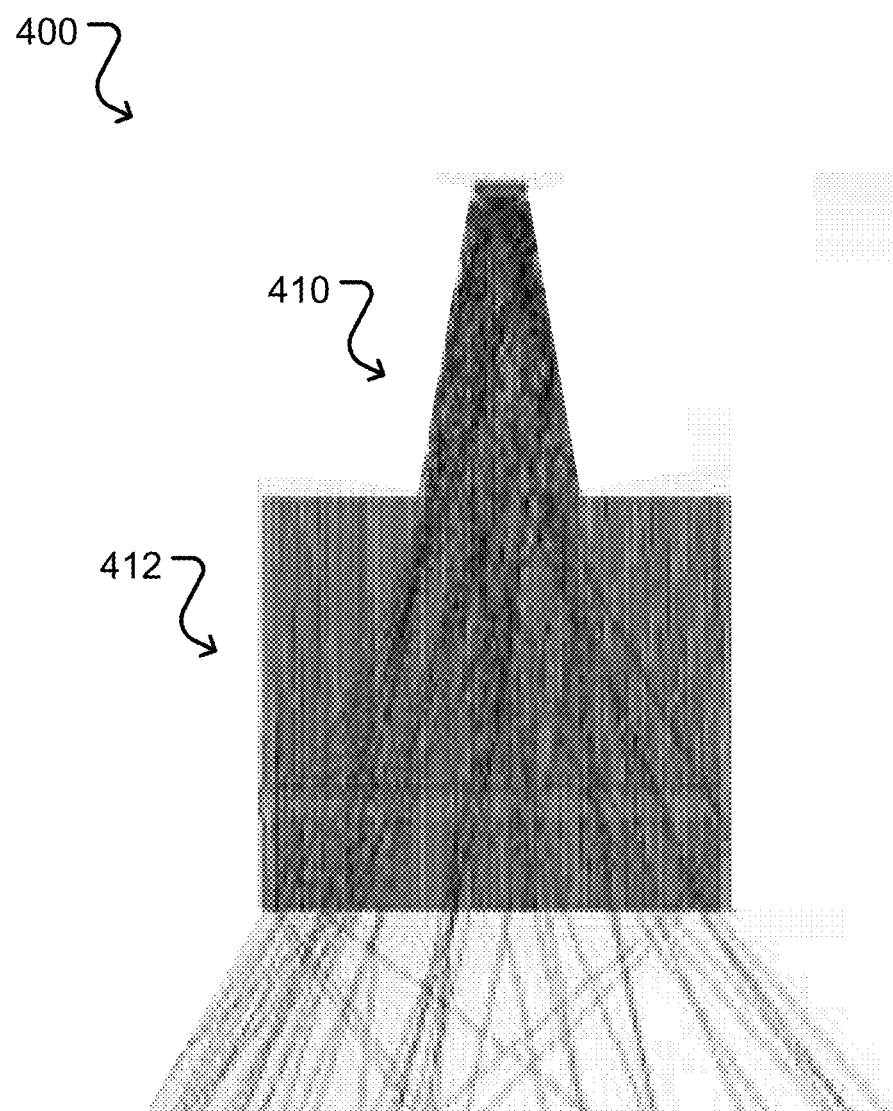
FIG. 31 is a front view of a light source and a light guide according to the embodiment shown in FIG. 25, showing for purposes of illustration a single collimator with exemplary simulated light ray traces.
Figure 32:
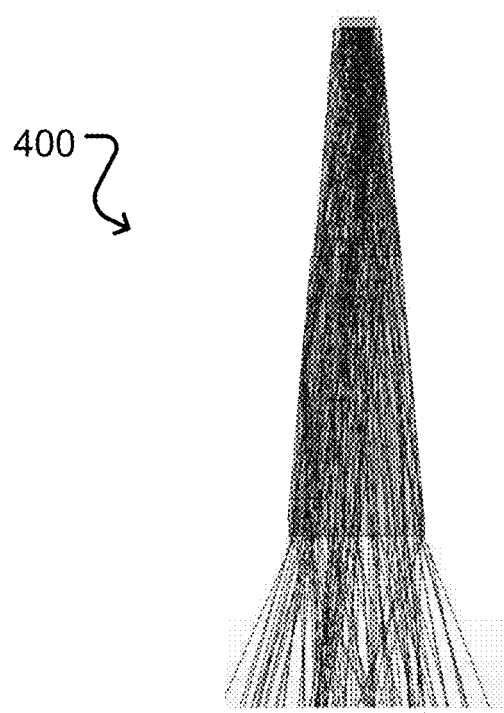
FIG. 32 is an cross sectional side view of a light source and a light guide according to the embodiment shown in FIG. 25, with exemplary simulated light ray traces.

The optical distribution of these reactions is plotted in FIG. 23, showing a desirable distribution with peak angles at approximately zero to 10 degrees for a medium distribution.

FIGS. 24A to 24H show exemplary simulated ray traces of light emitted from light guide 200 of a single ray reaction, where the ray enters light guide 300 from various angles from 0 to 70 degrees. From 0 to 20 degrees (FIGS. 24A to 24C), the light ray is refracted at the light receiving surface and travels down the light guide until it refracts out of the light emitting surface. From 30 to 70 degrees (FIGS. 24D to 24H), the ray to enter light guide 200 at a higher angle such that it internally reflects within the collimator, reducing the angle, and then refracts out of the light emitting surface.

FIGS. 25 to 28 show a light guide 400 according to an embodiment of the invention. Light guide 400 is similar to light guides 200 and 300 but is an example embodiment configured to emit a narrow distribution of approximately 20 to 30 degrees.

Similar to light guide 300, light receiving surface 414 of light guide 400 has a flat surface instead of V-shaped grooves. To ensure a narrow distribution and maximize collimation, collimator 410 lacks the flutes and steps of light guides 200 and 300. Also unlike light guides 100, 200 and 300, collimators 410 are arranged not in a side-by-side immediately adjacent manner but rather a corner edge by corner edge immediately adjacent manner. In some embodiments, angle 320 may be 75 to 89.9 degrees. Longitudinal corners or edges 434 of collimator 410 are rounded to reduce distances between diagonal reflections in collimator 410, creating more reflections and more collimation as a result. Major faces 426, 426' of base 412 have longitudinally extending flutes 428 to increase homogeneity of the exiting light.

FIGS. 29 to 32 illustrate exemplary simulated ray traces of light of multiple ray reactions. Rays are shown to internally reflect down to lower angles in the proximal to distal direction. Lower angle rays typically reflect once while higher angle rays are reflected multiple times. Each reflection results in the rays bending to lower angles.

Figure 33:
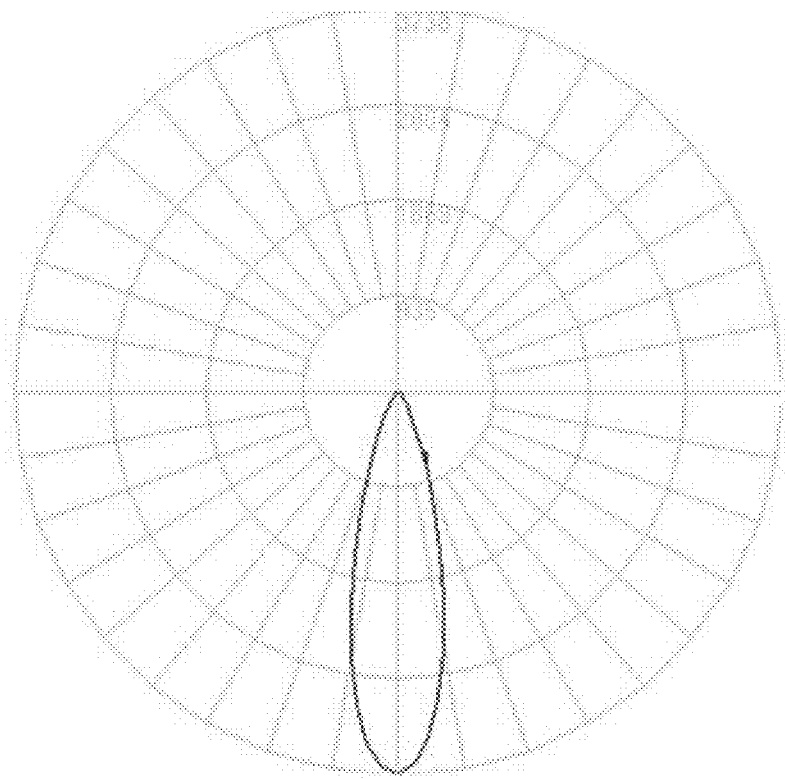
FIG. 33 is an optical distribution plot of exemplary simulated light rays emitted form a light guide according to the embodiment shown in FIG. 25.
Figure 34A:
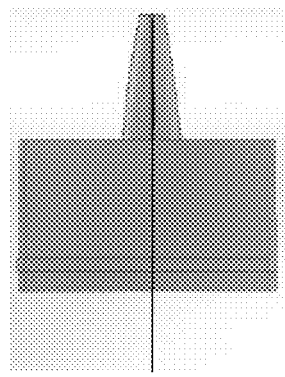
FIGS. 34A to 34H show exemplary simulated ray traces of light internally reflecting and then refracting out a light guide according to the embodiment shown in FIG. 25, when a single light ray enters the light receiving surface at the following incident angles: 34A at 0 degrees, 34B at 10 degrees, 34C at 20 degrees, 34D at 30 degrees, 34E at 40 degrees, 34F at 50 degrees, 34G at 60 degrees, 34H at 70 degrees and 34I at 80 degrees.
Figure 34B:
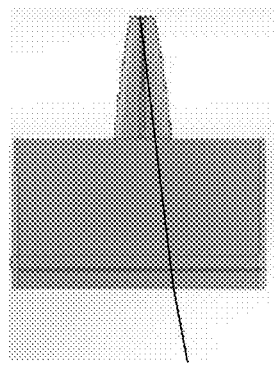
Figure 34C:
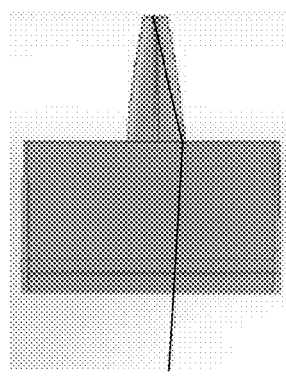
Figure 34D:
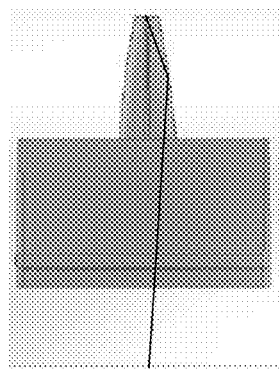
Figure 34E:
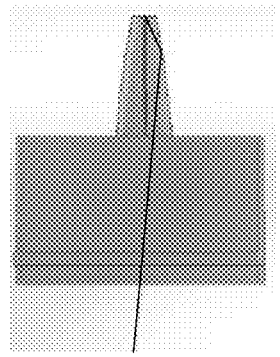
Figure 34F:
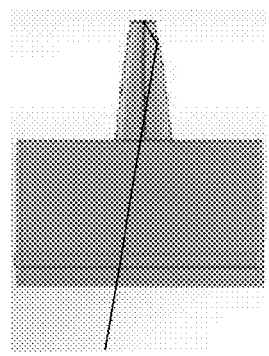
Figure 34G:
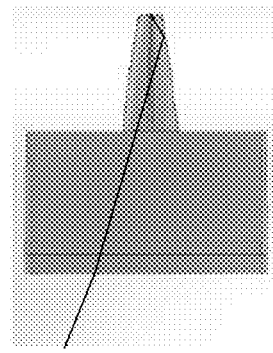
Figure 34H:
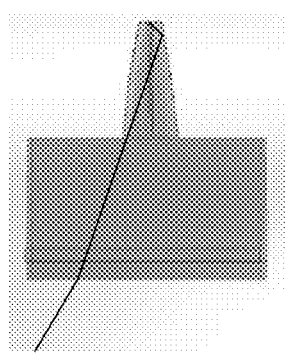
Figure 34I:
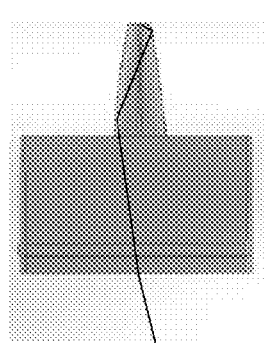

The optical distribution of these reactions is plotted in FIG. 33, showing a desirable distribution with an approximately zero degree peak angle for a narrow distribution.

FIGS. 34A to 34I show exemplary simulated ray traces of light emitted from light guide 400 of a single ray reaction, where the ray enters light guide 400 from various angles from 0 to 80 degrees. For 0 and 10 degrees (FIGS. 34A and 34B), the light ray is refracted at the light receiving surface and travels down the light guide until it refracts out of the light emitting surface. From 20 to 80 degrees (FIGS. 34C to 34I), the ray to enter light guide 400 at a higher angle such that it internally reflects at least once within the collimator, reducing the angle, and then refracts out of the light emitting surface.

FIGS. 42 to 47A show a light guide 600 according to an embodiment of the invention. Light guide 600 is similar to light guides 100, 200, 300 and 400, but light guide 600 has collimators spaced apart and has additional features for reducing glare.

Light guide 600 has collimators 610 spaced apart by spaces 632 along the length of base 612. Collimators 610 have a light emitting surface 611 at their proximal ends and connect to base 612 at their distal ends.

Collimators 610 may be generally shaped as rectangular frustums with opposing faces 616, 616' and opposing sides 618, 618'. Opposing faces 616, 616' may be continuous with respective opposing major faces 626, 626' of base 612. Base 612 has a light emitting surface 611 at its distal end.

Glare-reducing features of light guide 600 include notches 640 along light emitting surface 611, and protrusions 650 on collimators 610.

Figure 43:
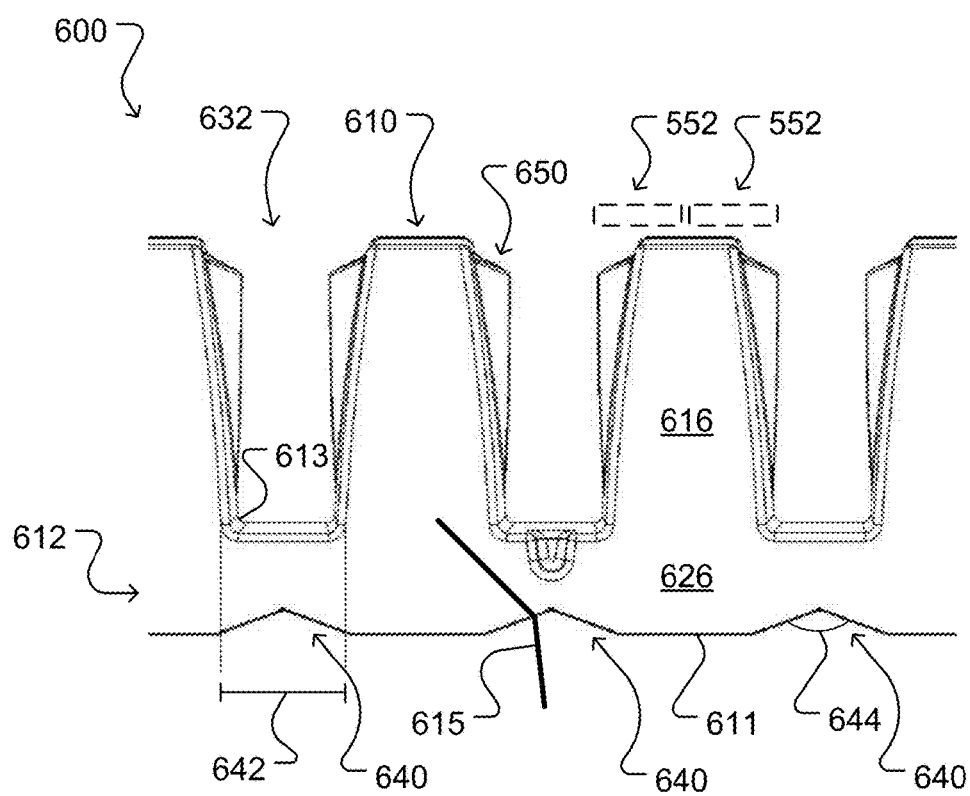
FIG. 43 is a close up front view of section A from FIG. 42.
Figure 44:
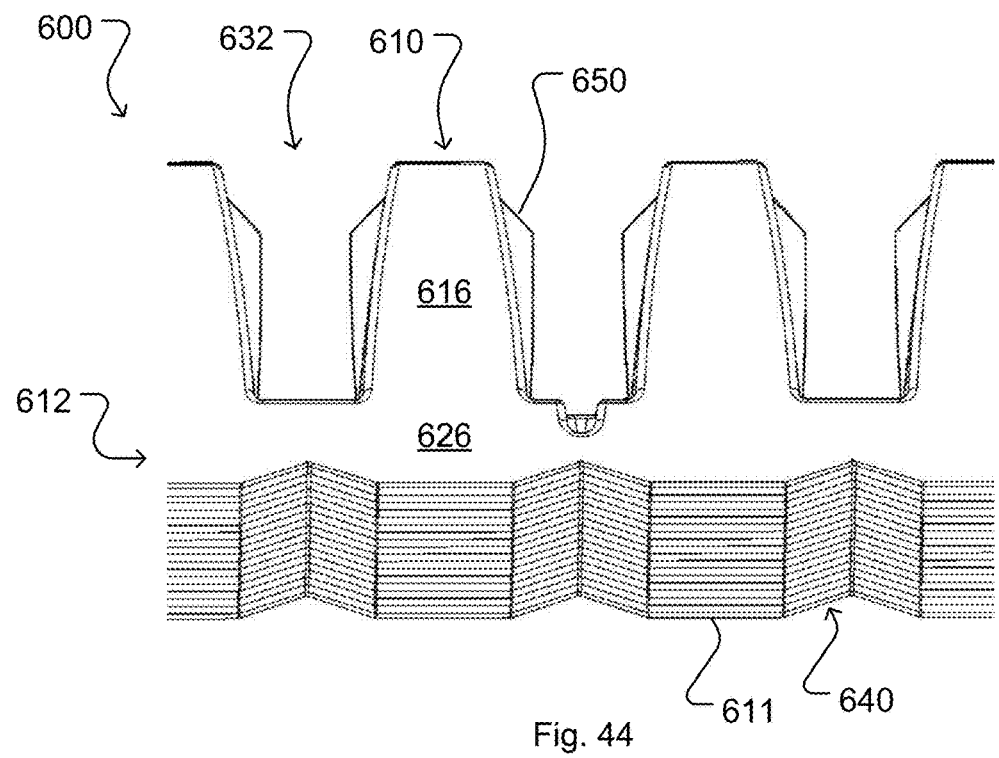
FIG. 44 is a close up bottom perspective view of section A from FIG. 42.
Figure 48:
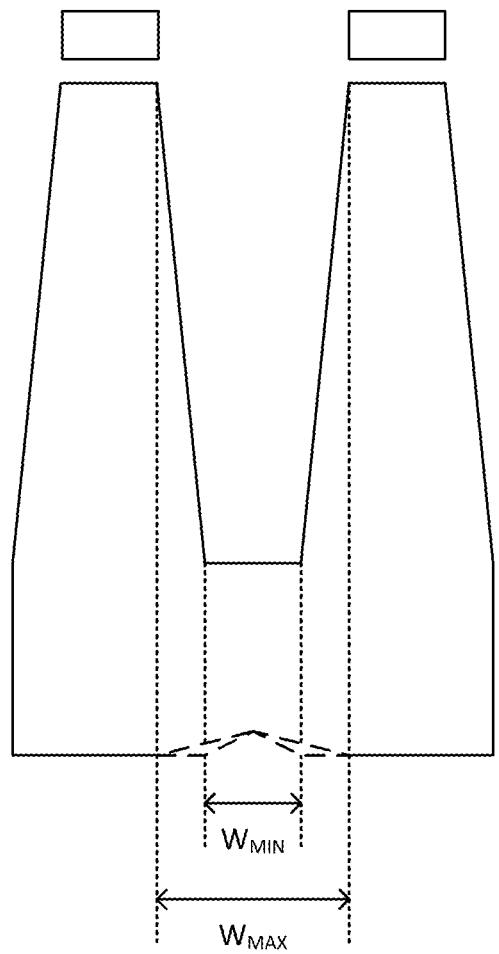
FIG. 48 is a front view of a light guide according to an embodiment.

As best shown in FIGS. 43 and 44, notches 640 are provided in regular intervals along light emitting surface 611. The location of notches 640 correspond with the location of spaces 632 between collimators 610. Notches 640 may have substantially the same width 642 as spaces 632. More generally, as shown in FIG. 48, each notch may have a minimum width $W_{MIN}$ corresponding to a space between the collimators and a maximum width $W_{MAX}$ corresponding to a space between the light receiving surfaces.

The inventors have determined that notches 640 refract otherwise glare-causing higher angle rays that were insufficiently collimated by collimators 610 into more desirable lower angle rays; see for example ray 615 shown in FIG. 43. The inventors have also determined that the sections of light emitting surface 611 directly beneath collimators 611 do not require such features because rays exiting such sections have been sufficiently collimated by opposing faces 616, 616' and opposing sides 618, 618' of collimators 610.

In some embodiments the surface of notches 640 may be textured, e.g. fluted, like the rest of light emitting surface 611, as shown in FIG. 44. In other embodiments, the surface of notches 640 and/or the rest of light emitting surface 611 may be specular.

In some embodiments, notches 640 may be upside down V-shaped. An opening angle 644 of upside down V-shaped notch 640 may be 90 degrees to 160 degrees. In particular example embodiments opening angle may be: about 140 degrees for wide distribution (about 70 degrees full beam angle); about 130 degrees for a medium distribution (about 45 degrees full beam angle); and about 105 degrees for an elliptical distribution (about 25 to 75 degrees full beam angle). In other embodiments, notches 640 may be other shapes that refract light into lower angles, such as a semi-circle, semi-ellipse, semi-polygons, or other shapes comprising straight lines and curved lines.

Opposing sides 618, 618' of each collimator 610 has a protrusion 650. An upper face 652 of protrusion 650 may be continuous with and define a lateral portion of light receiving surface 614. Upper face 652 may define a triangular lateral portion of light receiving surface 614. A vertex 653 of upper face 652 may have an angle of 90 to 130 degrees. As shown in FIG. 47A, upper face 652 and the rest of light receiving surface 614 together form a V-shaped indent that together pull light into lower angles to further control glare.

Protrusion 650 may be shaped as a mirrored sphenoid having triangular cross sections of diminishing size in the proximal to distal direction. Protrusion 650 tapers to the plane of opposing sides 618, 618' at a distal point 656 of protrusion 650. Distal point 656 is above a bottom 613 of collimator 610. In other embodiments protrusion 650 may be other mirrored shapes with a centerline peak with cross sections of diminishing size in the proximal to distal direction, and culminate in a point at the plane of opposing sides 618, 618' above the bottom 613 of collimator 610. FIG. 47B shows an example embodiment of such another protrusion.

The inventors have determined that protrusions 650 address the light that would otherwise escape from opposing sides 618, 618' by reflecting that light back into collimators 610 at other angles. The inventors have further determined that tapering protrusion 650 into distal point 656 above the bottom 613 of collimator 610 is significant; for example, if the protrusion had instead a consistent profile along the entire length of the collimator the inventors determined that the bottom portion of the protrusion directed light that was already traveling into other orientations and reflected it back along the length of the collimator, producing an undesirable effect of a visible image of the light source at the bottom of the collimator. The inventors have determined that this undesirable effect can be avoided by having protrusion 650 tapering to a distal point 656 at the plane of opposing sides 618, 618' at least half a width 553 of light source 552, or a range of half a width 553 to a full width 553, above the bottom of collimator 610.

Figure 45:
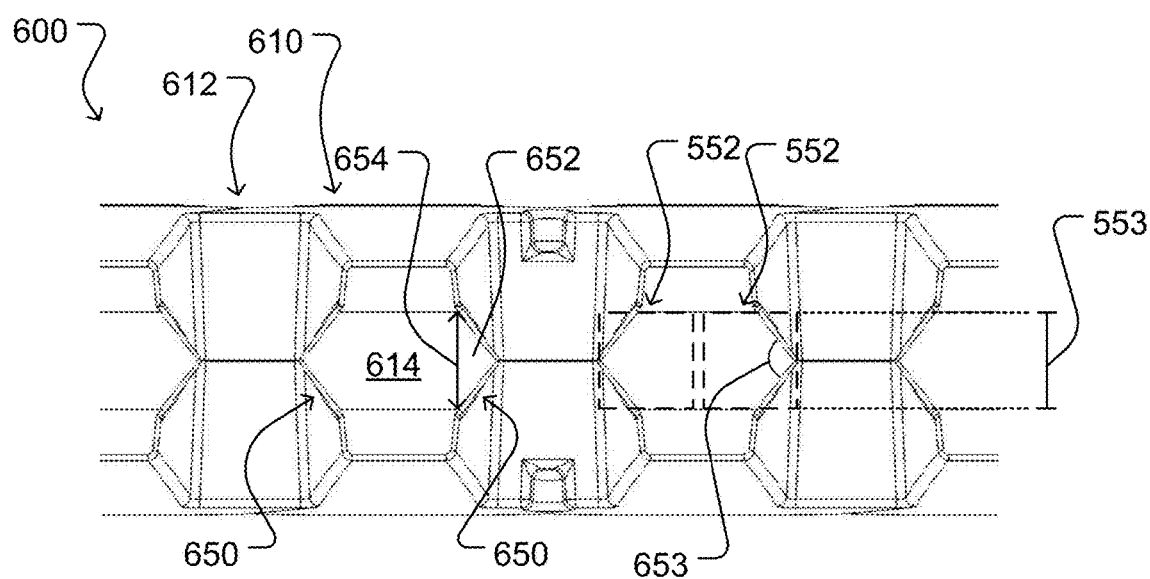
FIG. 45 is a close up top view of section A from FIG. 42.

In some embodiments each collimator 610 may be illuminated by a pair of light sources 552. As shown best in FIG. 43, the combined span of the light sources 552 may be substantially equal to the vertex to vertex span of light receiving surface 614. As best shown in FIG. 45, a width of light source 552 may be substantially equal to a maximum width of upper face 652 of protrusion 650 at light receiving surface 614.

In some embodiments protrusion 650 may have a fluted surface; in other embodiments protrusion 650 may have a specular surface.

Figure 35:
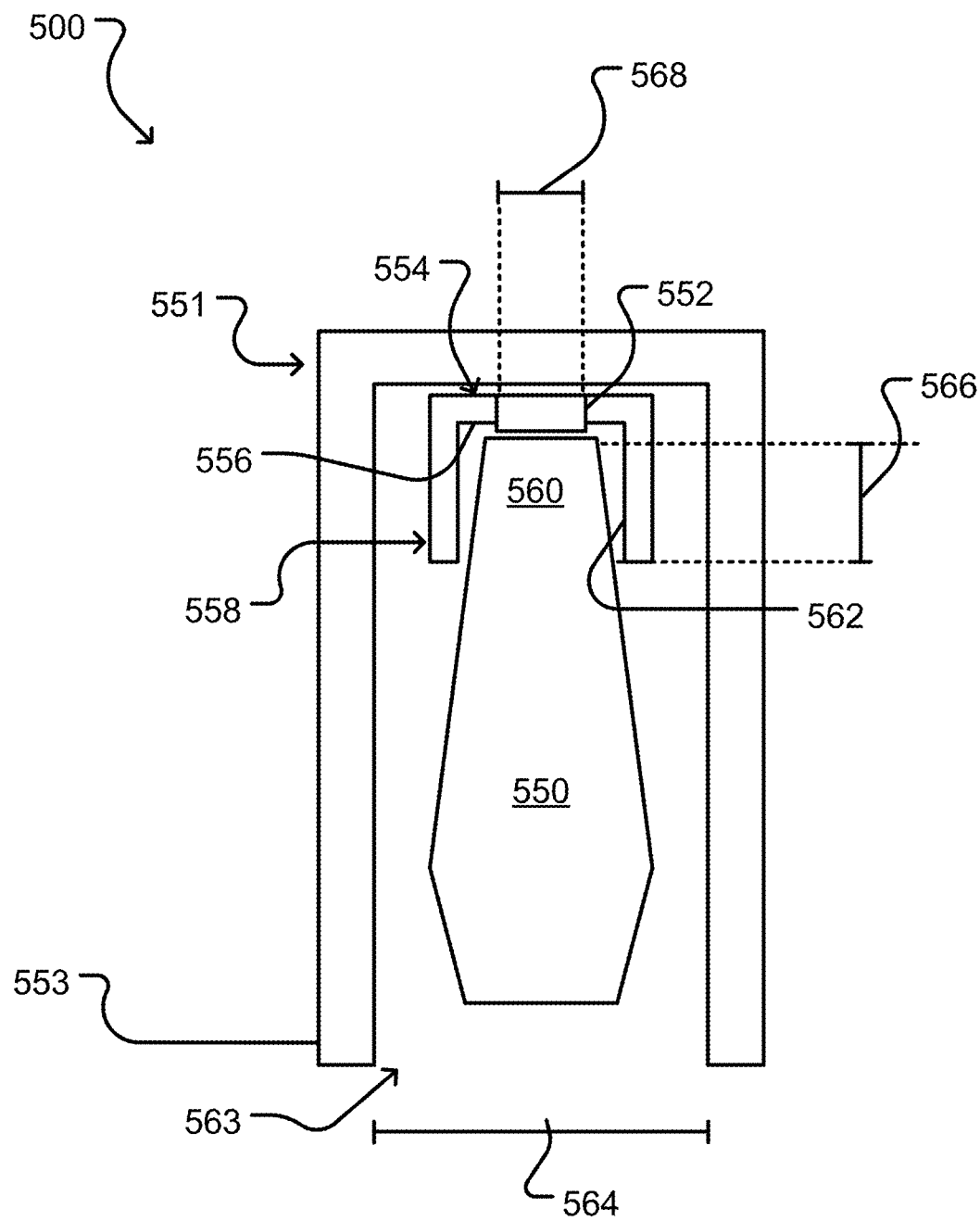
FIG. 35 shows a cross sectional side view of a luminaire according to an embodiment.

FIG. 35 shows a narrow aperture luminaire 500 according to an embodiment. Luminaire 500 has a housing 551 that houses a light guide 550. Light guide 550 may be any light guide according to the present invention, including for example light guide 100, 200, 300, 400 or 600. Housing 551 has distal walls 553 that may act as baffle to absorb or otherwise block any high angle light leaving the light emitting surface of light guide 550. In example embodiments, aperture 563 of housing 551 may have a width 564 ranging from 10 mm to 70 mm.

Point light sources 552 are mounted on board 554. Point light sources 552 may be LEDs, and configured for optical communication with the light receiving surface of light guide 550. Board 554 has an inner surface 556 that may be reflective to collect stray light from a proximal region 560 of light guide 550 and reflect it back into light guide 550.

Baffle 558 is positioned to laterally surround proximal region 560 of light guide 550. Baffle 558 has an inner surface 562 that may absorb stray light from proximal region 560. For example, high angle light that would otherwise result in high angle glare may be blocked by baffle 558. Baffle 558 may be configured to conform to the shape of, and when in position contact, the lateral sides of proximal region 560 of light guide 550. In other embodiments there may be space between baffle 558 and proximal region 560. Baffle 558 extends distally a distance 566 along proximal region 560 of light guide 550. In some embodiments, the ratio of distance 566 to width 568 of light source 552 may range from 2:1 to 5:1.

Figure 36:
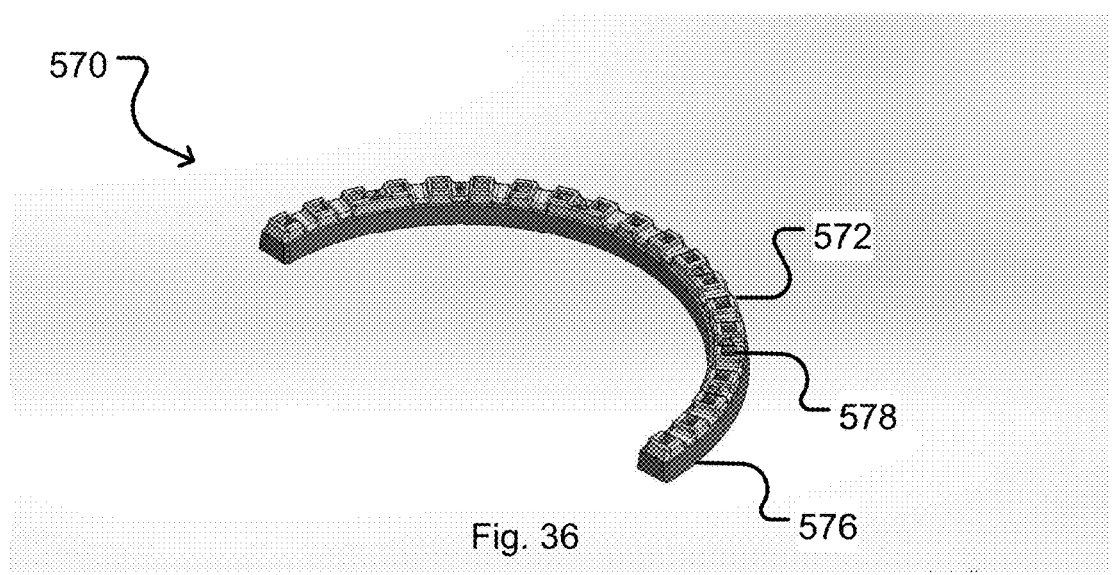
FIG. 36 is a top isometric view of an integral baffle board according to an embodiment.
Figure 37:
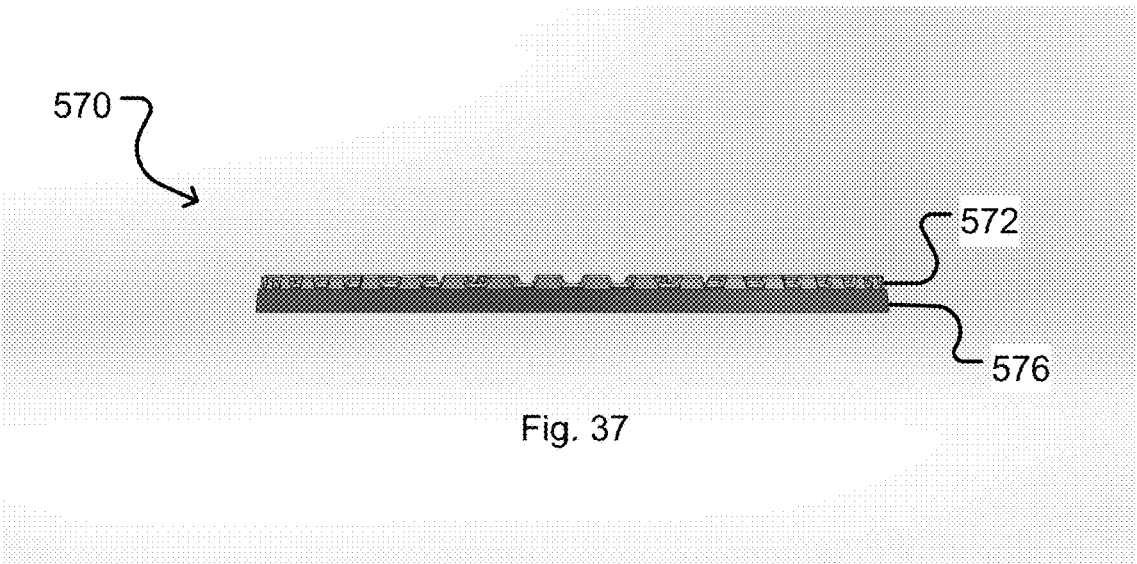
FIG. 37 is a side view of an integral baffle board according to the embodiment of FIG. 36.
Figure 38:
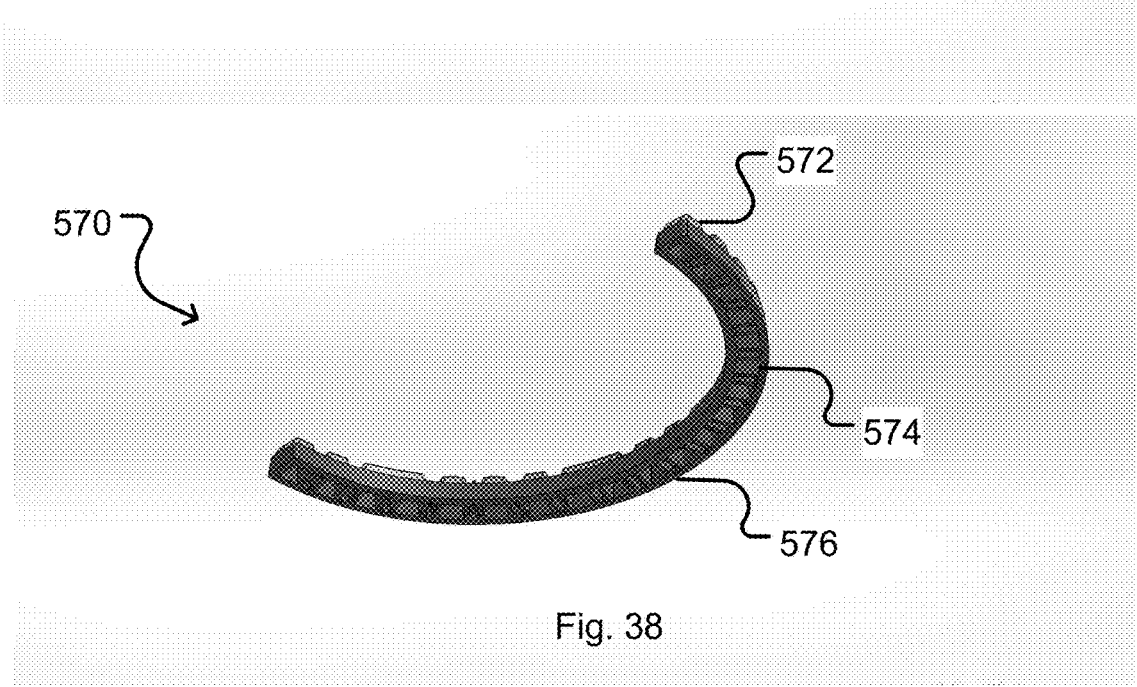
FIG. 38 is a bottom isometric view of an integral baffle board according to the embodiment of FIG. 36.

FIGS. 36 to 38 show an integrally formed baffle board 570 shaped to correspond to light guides 200, 300, 400 and 600. In other embodiments baffle board 570 may be any other shape that corresponds to a corresponding light guide. Baffle portion 572 has a plurality of hollow elements 574 for surrounding corresponding proximal regions of a plurality of collimators of the light guide. In some embodiments, hollow elements 574 may be shaped as hollow rectangular frustums.

Baffle portion 572 is made of a dark-coloured (e.g. black) material to absorb stray light from a proximal region of the light guide. Board portion 576 has a plurality of apertures 578 for mounting corresponding point light sources. Board portion 576 is made of a light-coloured (e.g. white) material to reflect stray light back into the light guide.

In some embodiments, such as that illustrated in the embodiments, the baffle may be integrally formed with the board. In other embodiments, the baffle and board may be distinct components.

Figure 41:
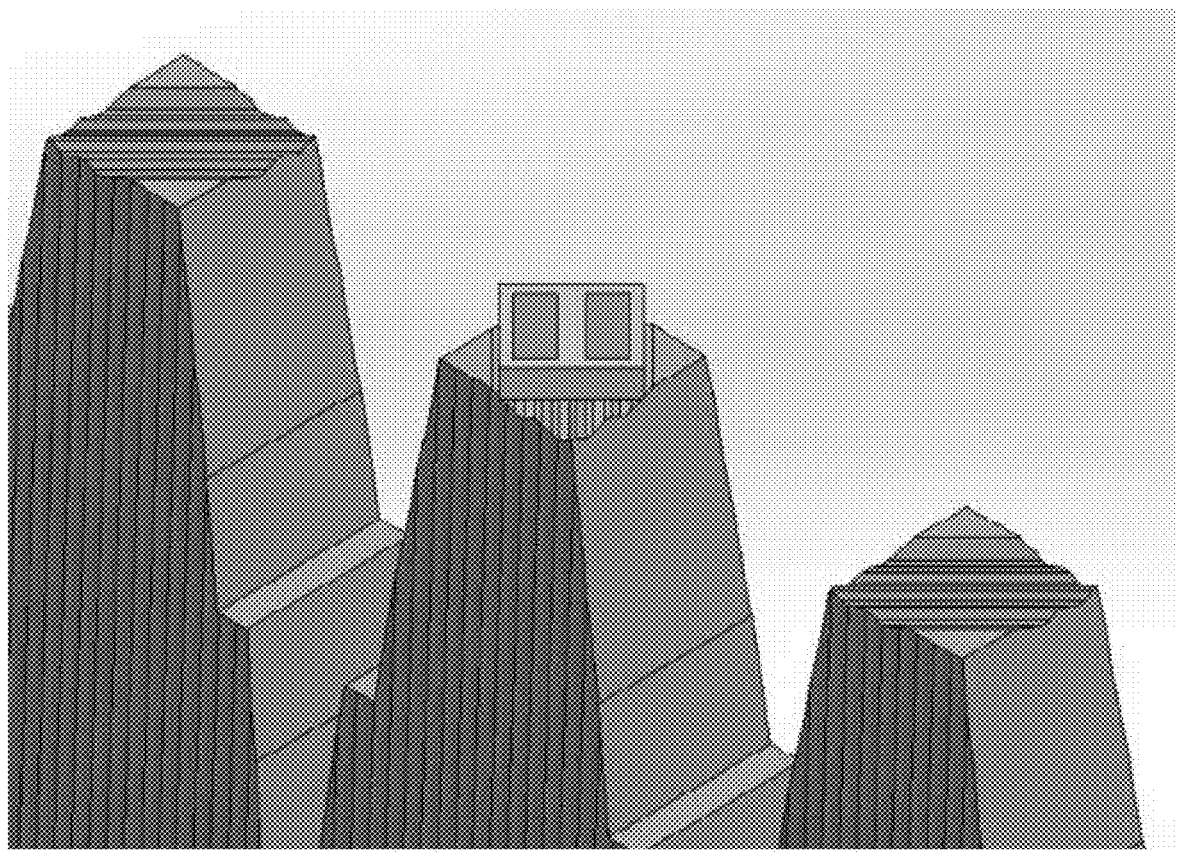
FIG. 41 is a close up partial top isometric view of a plurality of collimators of a light guide according to an embodiment.
Figure 42:
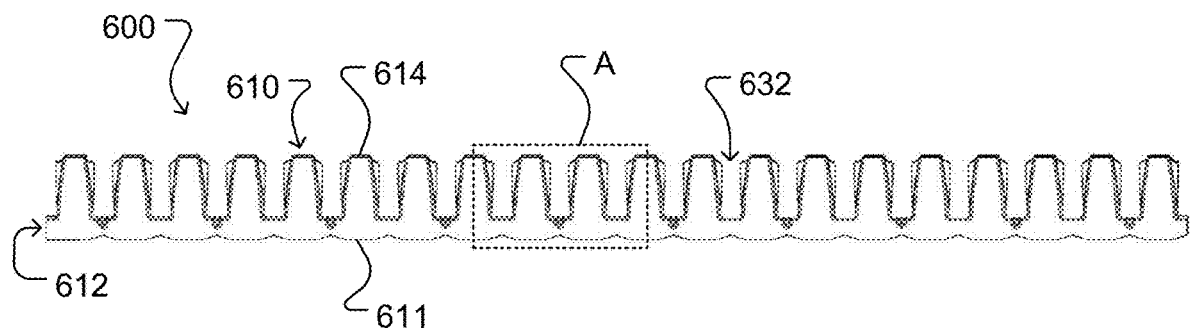
FIG. 42 is a front view of a light guide according to an embodiment.

The above describe certain embodiments of the invention. Other embodiments are possible. For example, in some embodiments:

the major faces of the base are smooth, i.e., do not comprise flutes;

the collimators in a side-by-side immediately adjacent arrangement are interconnected at their distal end, so that the distal ends comprise the light emitting surface, i.e., the light guide does not have a base;

the collimators and the base may be formed separately and then combined in a manner that permits optical communication between them;

the collimators may not be uniform in shape and/or size;

the collimators may be in the shape of a conical frustum (i.e., truncated cone);

the collimators expand laterally only along the opposing sides and not the opposing faces (i.e., angle 124 is 90 degrees);

the opposing sides of the collimators may be fluted;

the collimators may be configured to accommodate more than one light source; and the V-shaped grooves may run in directions other than parallel or perpendicular to the opposing faces of the collimator, and may not span the entirety of the proximal end of the collimator. For example, FIG. 41 shows another embodiment where the V-shaped grooves run in alternating 45 degree angles to the opposing faces. The light source is also oriented in a corresponding manner. Different angles may be possible depending for example on the shape of the light source (e.g. a rectangular LED instead of a square LED). Note for FIG. 41 that the light source is shown only with the middle collimator for illustrative purposes.

notches 640 may also be present in the light emitting surfaces of light guides such as light guides 100, 200, 300, 400 without spaces between the collimators; in such embodiments the notches may correspond in position to a point between collimators, "in shadow" of the majority of the controlled light rays from the light source, intended to address high angle less controlled stray light rays.

protrusions 650 may also be present on the collimators of light guides without spaces between the collimators, such as light guides 100, 200, 300, 400.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

The invention claimed is:

1. A light guide comprising:
an elongated base comprising a light emitting surface at a distal end, and opposing major faces; and
a plurality of collimators projecting from the base, wherein each collimator comprises a light receiving surface at a proximal end,
wherein the plurality of collimators are arranged with spaces therebetween along the base,
wherein the light emitting surface comprises notches having a minimum width corresponding to the space between the collimators and a maximum width corresponding to a space between the light receiving surfaces,
whereby substantially all light received at the light receiving surfaces internally reflects through the collimators and the base and emits from the light emitting surface, whereby the notches are configured to direct light emitted from the light emitting surface at a lower angle than if the notches were not present, and wherein each collimator comprises opposing sides, each opposing side comprising a protrusion, wherein an upper face of the protrusion defines a lateral portion of the light receiving surface, and wherein the protrusion tapers distally into a plane of the opposing side at a point along the opposing side at least half a width of a light source for the light guide above the bottom of the collimator.

2. A light guide according to claim 1 wherein the notches are upside down V-shaped.

3. A light guide according to claim 2 wherein an opening angle of each of the notches is between 90 to 160 degrees.

4. A light guide according to claim 1, wherein each collimator is shaped as a rectangular frustum comprising opposing faces and opposing sides, and wherein the opposing faces of the collimators are continuous with corresponding major faces of the base.

5. A luminaire comprising:
at least one light guide according to claim 1;
a plurality of light sources in optical communication with the light receiving surfaces;
a board onto which the plurality of light sources are mounted;
a housing for housing the light guide, the plurality of light sources, and the board.

6. A luminaire according to claim 5 wherein the light sources comprise light emitting diodes.

7. A light guide comprising:
an elongated base comprising a light emitting surface at a distal end, and opposing major faces; and
a plurality of collimators arranged in an adjacent manner and projecting from the base, wherein each collimator comprises a light receiving surface at a proximal end,
wherein each collimator comprises opposing sides, each opposing side comprising a protrusion, wherein an upper face of the protrusion defines a lateral portion of the light receiving surface, and wherein the protrusion tapers distally into a plane of the opposing side at a point along the opposing side at least half a width of a light source for the light guide above the bottom of the collimator, whereby substantially all light received at the light receiving surfaces internally reflects through the collimators and the base and emits from the light emitting surface.

8. A light guide according to claim 7 wherein the upper face of the protrusion is triangular.

9. A light guide according to claim 8 wherein a vertex of the upper face has an angle of 90 to 130 degrees.

10. A light guide according to claim 9 wherein the protrusion is shaped as a mirrored sphenoid having triangular cross sections of diminishing size in the proximal to distal direction.

11. A light guide according to claim 10 wherein the plurality of collimators are arranged with spaces therebetween along the base, and wherein the light emitting surface comprises notches having a minimum width corresponding to the space between the collimators and a maximum width corresponding to a space between the light receiving surfaces.

12. A light guide according to claim 11, wherein each collimator is shaped as a rectangular frustum comprising opposing faces and the opposing sides, and wherein the opposing faces of the collimators are continuous with corresponding major faces of the base.

13. A luminaire comprising:
at least one light guide according to claim 7;
a plurality of light sources in optical communication with the light receiving surfaces;
a board onto which the plurality of light sources are mounted;
a housing for housing the light guide, the plurality of light sources, and the board.

14. A luminaire according to claim 13 wherein each light receiving surface is associated with a pair of light sources, wherein a combined lateral span of the pair of light sources is substantially equal to a lateral span of the light receiving surface.

15. A luminaire according to claim 14 wherein a width of the light source is substantially equal to a maximum width of the protrusion at the light receiving surface.

16. A luminaire according to claim 15 wherein a distance from the point the protrusion tapers into the plane of the opposing side to the bottom of the collimator is substantially equal to half a width of the light source.

17. A luminaire according to claim 16 wherein the point light sources comprise light emitting diodes.

* * * * *